United States Patent [19]

Kato

[11] Patent Number: 5,497,283
[45] Date of Patent: Mar. 5, 1996

[54] MAGNETIC HEAD HAVING COIL BOBBINS SEPARATED FROM A TERMINAL ASSEMBLY

[75] Inventor: Minoru Kato, Chichibu, Japan

[73] Assignee: Canon Denshi Kabushiki Kaisha, Saitama, Japan

[21] Appl. No.: 152,926

[22] Filed: Nov. 16, 1993

Related U.S. Application Data

[63] Continuation of Ser. No. 649,008, Jan. 25, 1991, abandoned.

[30] Foreign Application Priority Data

Jan. 30, 1990 [JP] Japan .................................. 2-19759
Nov. 22, 1990 [JP] Japan .................................. 2-316029

[51] Int. Cl.[6] .............................. G11B 5/17; G11B 5/265
[52] U.S. Cl. ..................... 360/123; 360/121; 360/128
[58] Field of Search ................................. 360/110, 121, 360/122, 123, 126, 127, 103, 104, 128; 29/603

[56] References Cited

U.S. PATENT DOCUMENTS

| | | | |
|---|---|---|---|
| 3,064,333 | 11/1962 | Kristiansen et al. | 360/121 |
| 3,311,710 | 3/1967 | Murphy et al. | 360/121 |
| 3,432,921 | 3/1969 | Page | 360/121 |
| 3,495,048 | 2/1970 | Gooch | 360/122 |
| 3,564,153 | 2/1971 | Kronfeld | 360/128 |
| 3,614,830 | 10/1972 | Bate et al. | 360/128 |
| 3,668,775 | 6/1972 | Morita et al. | 29/603 |
| 4,085,429 | 4/1978 | Hasegawa | 360/119 |
| 4,392,166 | 7/1983 | Ishikawa et al. | 360/123 |
| 4,520,555 | 6/1985 | Gyi et al. | 360/104 |
| 4,750,071 | 6/1988 | Kato et al. | 360/121 |
| 4,788,613 | 11/1988 | Yamashita | 360/123 |
| 4,791,513 | 12/1988 | Okita | 360/104 |
| 4,823,217 | 4/1989 | Kato et al. | 360/104 |
| 4,879,620 | 11/1989 | Yamashita | 360/104 |
| 5,005,097 | 4/1991 | Matsuoka | 360/123 |
| 5,276,578 | 1/1994 | Kato et al. | 360/122 |

FOREIGN PATENT DOCUMENTS

| | | | |
|---|---|---|---|
| 60-106020 | 6/1985 | Japan | 360/104 |
| 62-222407 | 9/1987 | Japan . | |
| 62-222409 | 9/1987 | Japan . | |

Primary Examiner—Stuart S. Levy
Assistant Examiner—Paul J. Ditmyer
Attorney, Agent, or Firm—Spencer & Frank

[57] ABSTRACT

A magnetic head includes a magnetic core having a slidable contact surface and a side face, a coil bobbin arranged around the magnetic core, a coil wound around the coil bobbin, and a slider having a notch and connected to the side face of the magnetic core. The slider together with the magnetic core are in slidable contact with a magnetic recording medium. A plurality of terminals, each of which is connected to an end of the coil, and a terminal holding member for holding the plurality of terminals are provided. The terminal holding member is disposed substantially within a space defined by the notch and is separated from the coil bobbin.

9 Claims, 20 Drawing Sheets

MAGNETIC HEAD HAVING COIL BOBBINS SEPARATED FROM A TERMINAL ASSEMBLY

This application is a continuation of application Ser. No. 07/649,008, filed Jan. 25th, 1991 (now abandoned).

BACKGROUND OF THE INVENTION

1. Field of the Invention

The present invention relates to a magnetic head which performs magnetic recording or reproduction of information to or from a magnetic recording medium by slidably contacting the magnetic recording medium with a magnetic core and more particularly to a magnetic head having a magnetic core which is sandwiched by sliders that slidably contact the magnetic recording medium together with the magnetic core.

2. Description of the Prior Art

As a magnetic head of the above-described type, there is a magnetic head which is used in a floppy disc drive or "FDD" that performs magnetic recording or reproduction of information to or from a disc-shaped magnetic recording medium such as a flexible magnetic disc, i.e., a floppy disc. The conventional magnetic head for a floppy disc drive will be explained with reference to FIGS. 1–4.

FIG. 1 shows an arrangement of a body of a magnetic head. In FIG. 1, reference numeral 1 denotes a core assembly. The core assembly 1 is arranged as a combination of a recording/reproduction core 2, a magnetic core for recording and reproduction, and an erasing core 4, as a magnetic core for performing so-called tunnel erasure, i.e., for erasing a magnetic recording at both ends of a recording track, with their respective front core portions being connected to each other via a spacer 6.

The recording/reproduction core 2 includes a T-shaped first front core 2a, an I-shaped second front core 2b being connected with the first front core 2a via a recording/reproduction gap 3, and a rear core 15 as a third core being connected with rear ends of the first and second front cores 2a and 2b to magnetically connect the rear end of the first front core 2a with that of the second front core 2b.

The erasing core 4 includes a T-shaped first front core 4a, an I-shaped second front core 4b being connected with the first front core 4a via erasing gaps 5a and 5b, in the same manner as the above-described recording/reproduction core 2, and a rear core 16 as a third core being connected with rear ends of the front cores 4a and 4b.

However, the recording/reproduction core 2 and the erasing core 4 are connected to each other via the spacer 6 to form the core assembly 1 before they are connected to their rear cores 15 and 16, respectively. Non-magnetic sliders 7 and 8 are connected on both sides of the assembly core 1 by means of adhesion bond or glass welding or the like thereby to sandwich the core assembly 1 therebetween.

The sliders 7 and 8, together with the recording/reproduction core 2 and the erasing core 4, contact slidably a magnetic disc (not shown) to stabilize the slidable contact of the both cores 2 and 4 on the magnetic disc and reinforce the cores 2 and 4. The sliders 7 and 8 are made of ceramic materials or the like. The sliders 7 and 8 have notches 7a and 8a, respectively and are formed as blocks each having a L-shaped cross section. The sliders 7 and 8 each have a side face opposing the core assembly 1. The side faces have respective projected faces projecting toward the core assembly 1, the projected faces being located at upper portions above the notches 7a and 8a as shown in FIG. 1, respectively. The projected faces of the sliders 7 and 8 as bonding faces 7b and 8b are connected to both side faces of upper end portion of the core assembly 1 by means of adhesion bond or glass welding.

After the connection, a coil bobbin 9 on which a coil 10 for recording or reproduction is wound around, and a coil bobbin 12 on which a coil 13 for erasing is wound around, are fitted to the core assembly 1 so that the front cores 2a and 4a are inserted into respective cavities of the coil bobbins 9 and 12. Consequently, the rear cores 15 and 16 connected to each other via a spacer 17 are connected to the rear ends of the front cores 2a, 2b, 4a and 4b to arrange a magnetic head body 18 as shown in FIG. 2.

As shown in FIG. 1, the above-described coil bobbins 9 and 12 include respective rectangular-shaped bodies having holes 9a and 12a, and flanges 9b and 12b being formed at both ends of the bodies to restrict the winding widths of the coils 10 and 13, respectively.

FIG. 2 is a perspective view of a side of the whole magnetic head opposing a magnetic disc, and FIG. 3 is a perspective view showing the rear side of the whole magnetic head shown in FIG. 2. In FIGS. 2 and 3, reference numeral 19 designates a magnetic head. The magnetic head 19 is assembled by positioning at a predetermined position of a support plate 20 made of stainless steel or phosphor bronze and fixing a magnetic body 18 on the position, by connecting the support plate 20 to a flexible printed board 21 for conducting it to an external circuit, and by connecting coil ends 10a and 13a to the flexible printed board 21.

As shown in FIG. 4, a squared cylindrical-shaped shield ring 22 surrounding the magnetic head body 18 is mounted on the magnetic head 19.

The magnetic head 19 is mounted on a floppy disc drive (not shown) by fixing the support plate 20 to a head carriage in the floppy disc drive. The magnetic head 19 performs magnetic recording or reproduction of information to or from the magnetic disc by slidably contacting the magnetic disc which is rotating, with an upper face shown in FIG. 2 of the magnetic head body 18 serving as a sliding face.

The above-described shield ring 22 is made of a shielding material for shielding the magnetic head body 18 from external noise, such as noise due to leakage flux from a permanent magnet in a disc drive motor used in the floppy disc drive, and high frequency noise generated from a display close to the floppy disc drive when the floppy disc drive is assembled in a system. The shield ring 22 is made of a high magnetic permeability material, such as Permalloy, or a high conductivity material, such as aluminum or copper, or combination of these materials.

Reduction in size of disc drive units has been recently promoted, various noise sources have been arranged close to the magnetic head 19 and accordingly the shield ring 22 has become an indispensable element.

In the conventional magnetic head for the floppy disc drive, the coil ends 10a and 13a, respectively, are connected to connection parts 21a of the printed board 21 by soldering. However, upon connecting, it is troublesome to carry out positioning of the coil ends 10a and 13a to the connection portions 21a properly and it takes a considerably long time to perform the soldering. In addition, when heated for a long time, the connection portions 21a are peeled off from the printed board, which makes the soldering step a very difficult step to perform. The soldering step has been an obstacle to simplification of steps for manufacturing magnetic heads.

In a composite type magnetic head which will be explained later on, there are many coil ends and accordingly the above-described problems are more severe. In addition, a lack of ample space for arranging components is a serious problem hindering the composite type magnetic head from commercialization. In order to solve these problems, a bobbin terminal type magnetic head has been proposed in which the coil bobbins 9 and 12 are provided with terminal portions.

FIGS. 5–7 show the conventional bobbin terminal type magnetic head. In FIGS. 5–7, those parts or components corresponding to those in FIGS. 1–3 are designated by the same reference numerals and detailed explanations thereof are thus omitted.

FIG. 5 shows a magnetic head body of the bobbin terminal type magnetic head. As shown in FIG. 5, coil bobbins 9 and 12 to be fitted to the front cores 2a and 4a, respectively, of the core assembly 1, have terminal holding portions 9c and 12c formed at one end of flanges 9b and 12b, respectively. A plurality of terminals 9d and 12d made of an electroconductive material are planted on the bobbin terminal holding portions 9c and 12c, respectively.

A coil for recording/reproduction 10 and an erasing coil 13 are wound around the coil bobbins 9 and 12, respectively, and then coil terminals 10a and 13a of the coils 10 and 13, respectively, are wound around terminals 9d and 12d, respectively, a plurality of times according to their arrangement and soldered.

On the other hand, the sliders 7 and 8 are formed with notches 7c and 8c, respectively, which serve as escape spaces for the bobbin terminal holding portions 9c and 12c, respectively, and with reinforcing portions 7d and 8d, respectively, for increasing bonding area between the core assembly 1 and the sliders 7 and 8 to increase the connection strength therebetween and thus connection strength between the support plate 20 and the sliders 7 and 8. These components are assembled in the same manner as shown in FIGS. 1 to 3 to arrange the magnetic head body 18.

FIG. 6 is a rear face perspective view showing the magnetic head body shown in FIG. 5 in a state where the magnetic head body is mounted onto a support plate. As shown in FIG. 6, the magnetic head body 18 is fixed to the support plate 20 after properly positioning thereon. The support plate 20 is formed with first escape spaces 20a for rear cores 15 and 16 which continue to second escape holes 20b for terminals 9d and 12d. The terminals 9d and 12d of the coil bobbins 9 and 12, respectively, are projected so as to pass through the second escape holes 20b to arrange on a rear face of the support plate 20, i.e., on a face opposite to a face where the slidable contacting face of the magnetic head body is disposed.

FIG. 7 is a perspective view showing the rear face of the magnetic head shown in FIG. 6 in a state where a printed board is mounted on the support plate 20. As shown in FIG. 7, a plurality of connection portions 21a are arranged on a printed board 21 at positions corresponding to the terminals 9d and 12d. The connection portions 21a are formed with holes 21b through which the terminals 9d and 12d are inserted. The terminals 9d and 12d and the connection portions 21a are connected by, for example, soldering to arrange the magnetic head 19.

In the bobbin terminal type magnetic head thus arranged, it is easy to connect between the coil ends 10a and 13a and the connection portions 21a. However, the terminal holding portions 9c and 12c provided on one end of the flange 9b and on one end of the flange 12b, respectively, of the coil bobbins 9 and 12 tend to be deformed due to heat applied thereto at the time of connecting the coil ends 10a and 13a to the terminals 9d and 12d by soldering.

Attempts to prevent thermal deformation of the terminal holding portions 9c and 12c by increasing their size has been unsuccessful because there is a restriction on space. If it were possible to increase the size of the terminal holding portions 9c and 12c, it would also be necessary to increase the size of the notches 7c and 8c provided in the sliders 7 and 8, respectively, which serve as escape spaces for the terminal holding portions 9c and 12c. If this were done, the connection strength between the sliders 7 and 8 and the support plate 20 would decrease. Furthermore, in that case, it would also be necessary to increase the size of the escape holes 20b in the support plate 20 for passing the terminals 9d and 12d, respectively therethrough. For reasons which will be explained later on, there are restrictions in size and shape of the support plate 20 and therefore a problem arises that the escape holes 20b cannot be made larger. That is, the support plate 20 has escape holes 20b so that the magnetic head 19 can follow the oscillation and rocking of a magnetic recording medium (not shown) when the slidable contacting face of the magnetic head 19 is in slidable contact with a magnetic recording medium to perform recording/reproduction of information. In addition, recently, extensive investigation has been made in order to reduce in size floppy disc drive units using the magnetic head 19 described above and increase the density thereof, and accordingly the appearance and shape of the support plate 20 have been reduced in size in accordance with such activities. The smaller the support plate 20, the more difficult it is for the dimension "h" of the support plate 20 as shown in FIG. 6 to be enlarged, resulting in that the mechanical strength of the support plate 20 decreases causing the problem that deformation tends to occur.

Furthermore, it would be necessary to form holes 21b for inserting therein terminals 9d and 12d in the flexible printed board 21 at positions corresponding to the terminals 9d and 12d, respectively. The size of the holes 9a and 12a formed in the bobbins 9 and 12 are made somewhat larger than the size of the core 2a and 4a so that the cores are not damaged when the cores 2a and 4a are inserted in the holes 9a and 12a, respectively, at the time of assembling. Hence, fluctuations in the distance between the terminals 9d and 12d as well as in their positions tend to occur due to fluctuations in the size of core assembly 1 and the clearances of the holes 9a and 12a of the coil bobbins 9 and 12, respectively. Therefore, it becomes necessary that the holes 21b in the printed board 21 be larger in size than the terminals 9d and 12d, respectively. However, it is sometimes difficult to make the connection portions 21a larger depending on the size of the support plate 20. As a result, it has often been the case that when the printed board 21 is fabricated, the connection portions 21a are cut, thereby decreasing processing yield which in turn causes an increase in the cost of parts.

Because the coil bobbins 9 and 12 have flanges 9b and 12b which are too thin, and therefore their moldability is too poor, to fabricate them using a material having a higher thermal resistance, there results an increase in cost of material and an aggravation of yield, thus considerably aggravating productivity, which are factors for increasing the cost of production of the coil bobbins 9 and 12.

Further, the shield ring 22 is bonded to the support plate 20, which in turn is fixed to the magnetic head 19. In accordance with the recent trend in which the size of floppy disc drives has been reduced, it becomes necessary to make the support plate 20 smaller, which reduces space for mounting the shield ring 22. Therefore, it is difficult to coat a sufficient amount of adhesive, and accordingly the adhesion strength decreases due to aging of the adhesive. In this case, it is sometimes the case that the shield ring 22 will drop off from the magnetic head body 18 as a result of vibration or shock accompanying by the head seeking action or the like of the floppy disc drive.

In the case where the shield ring 22 is made of a magnetic material such as Permalloy, it is necessary to attach it to the support plate 20 by positioning it so that there is a predetermined clearance from the magnetic head body 18. This operation is also cumbersome and takes a long time, thus causing an obstacle to the simplification of production steps.

SUMMARY OF THE INVENTION

It is an object of the present invention to provide a novel magnetic head which facilitates connection of coil ends to be wound around the core to the printed board, which enables rationalization of operation and of steps, and which can endow it with the multiple functions in accordance with reduction in size of magnetic recording apparatus and the higher density used in magnetic recording.

It is another object of the present invention to provide a magnetic head which can facilitate connection of coil ends and at the same time perform fitting of shield rings with ease and certainty so that dropping off of the shield rings can be prevented.

In the first aspect of the present invention, a magnetic head comprises:

a magnetic core having a slidable contact face, a coil wound around the magnetic core, a slider having a notch and connected to said side face of the magnetic core, the slider together with the magnetic core being in slidable contact with a magnetic recording medium, and a terminal assembly having a plurality of terminals each of which is connected to an end of the coil, and arranged in the notch of the slider remote from the coil.

The terminal assembly may have a terminal holding portion for holding the plurality of terminals, and the terminal holding portion may be arranged in a notch formed in the slider.

Further, the terminal holding portion, and the coil wound around the magnetic core may be remote from each other in a direction along a slidable contact face of the magnetic recording medium. Alternatively, the terminal holding portion, and the coil wound around the magnetic core may be remote from each other in a direction perpendicular to a slidable contact face of the magnetic recording medium.

In the second aspect of the present invention, a magnetic head comprises:

a plurality of magnetic cores connected to each other through a filler plate, a plurality of coils wound around the magnetic cores, respectively, a slider having a notch and connected to the magnetic core, the slider together with the magnetic core being in slidable contact with a magnetic recording medium, and a terminal assembly having a plurality of terminals each of which is connected to respective ends of the coils, and arranged in the notch of the slider.

In the third aspect of the present invention, a magnetic head comprises:

a core assembly including a recording/reproduction magnetic core for performing magnetic recording or reproduction of information to or from a magnetic recording medium and an erasing magnetic core for performing magnetic erasure of the magnetic recording medium, coils wound around the magnetic cores, respectively, through a bobbin, a slider having a notch and connected to side faces of the magnetic cores, the slider together with the magnetic cores being in slidable contact with the magnetic recording medium, a first terminal assembly having a plurality of terminals each of which is connected to an end of the coil wound around the erasing magnetic core, and integrally formed in the bobbin intervening between the erasing magnetic core and the coil wound around the erasing magnetic core, and a second terminal assembly having a plurality of terminals each of which is connected to an end of said coil wound around the recording/reproduction magnetic core, and arranged in the notch of the slider.

In the fourth aspect of the present invention, a magnetic head comprises:

a magnetic head body including:

a magnetic core, a coil wound around the magnetic core, and a slider sandwiching the magnetic core, the sliders together with the magnetic core being in slidable contact with a magnetic recording medium, and a terminal assembly having a terminal which is connected to an end of the coil, and a terminal holding member on which the terminal is planted, and a shield member for shielding the magnetic head body from external noise, the shield member being fitted to the magnetic core body through the terminal holding member.

The terminal assembly may be fitted in and fixed to the slider.

In the fifth aspect of the present invention, a magnetic head comprises:

a magnetic head body, including:

a magnetic core, a slider having a notch, the slider sandwiching the magnetic core, the slider together with the magnetic core being in slidable contact with a magnetic recording medium, and a holding member having an end which projects from an end of the slider and arranged in the notch of the slider, and a shield member having a connection portion connected to an end of the holding member and arranged around the magnetic head body to shield the magnetic head body from external noise.

Here, both ends of the holding member may be projected from the slider, and the shield member may have a pair of connection portions for connecting to the both ends of the holding member.

The above and other objects, effects, features and advantages of the present invention will become more apparent from the following description of embodiments thereof taken in conjunction with the accompanying drawings.

DETAILED DESCRIPTION OF THE PREFERRED EMBODIMENTS

Figure 1:
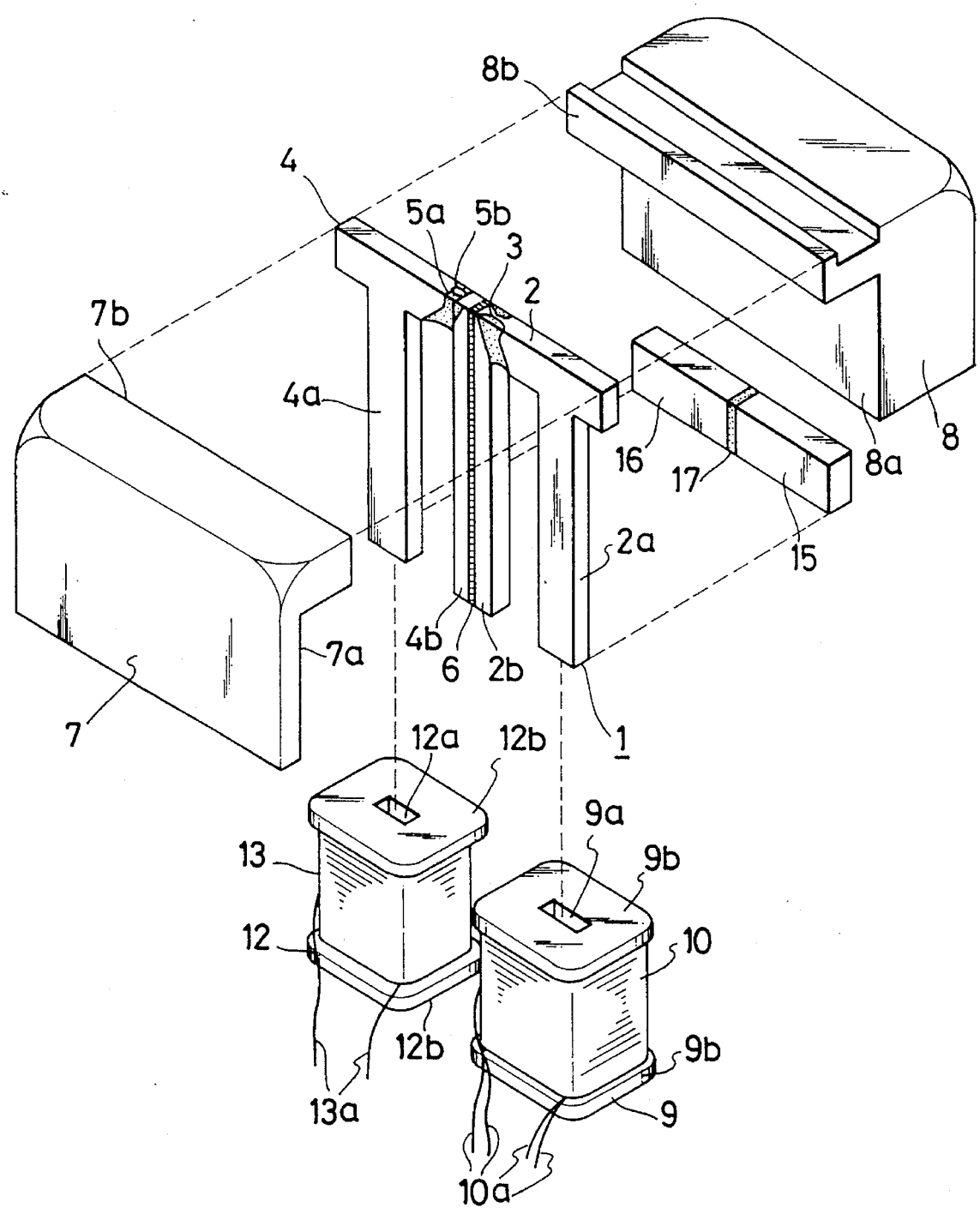
FIG. 1 is an exploded perspective view showing an arrangement of a magnetic head body for a conventional floppy disc drive.

Hereinafter, embodiments of the present invention will be explained in detail with reference to the accompanying drawings, in which those components or parts which are common with those shown in FIGS. 1 to 7 are designated by the same reference numerals and detailed explanation thereof will be omitted herein.

First Embodiment

Figure 8:
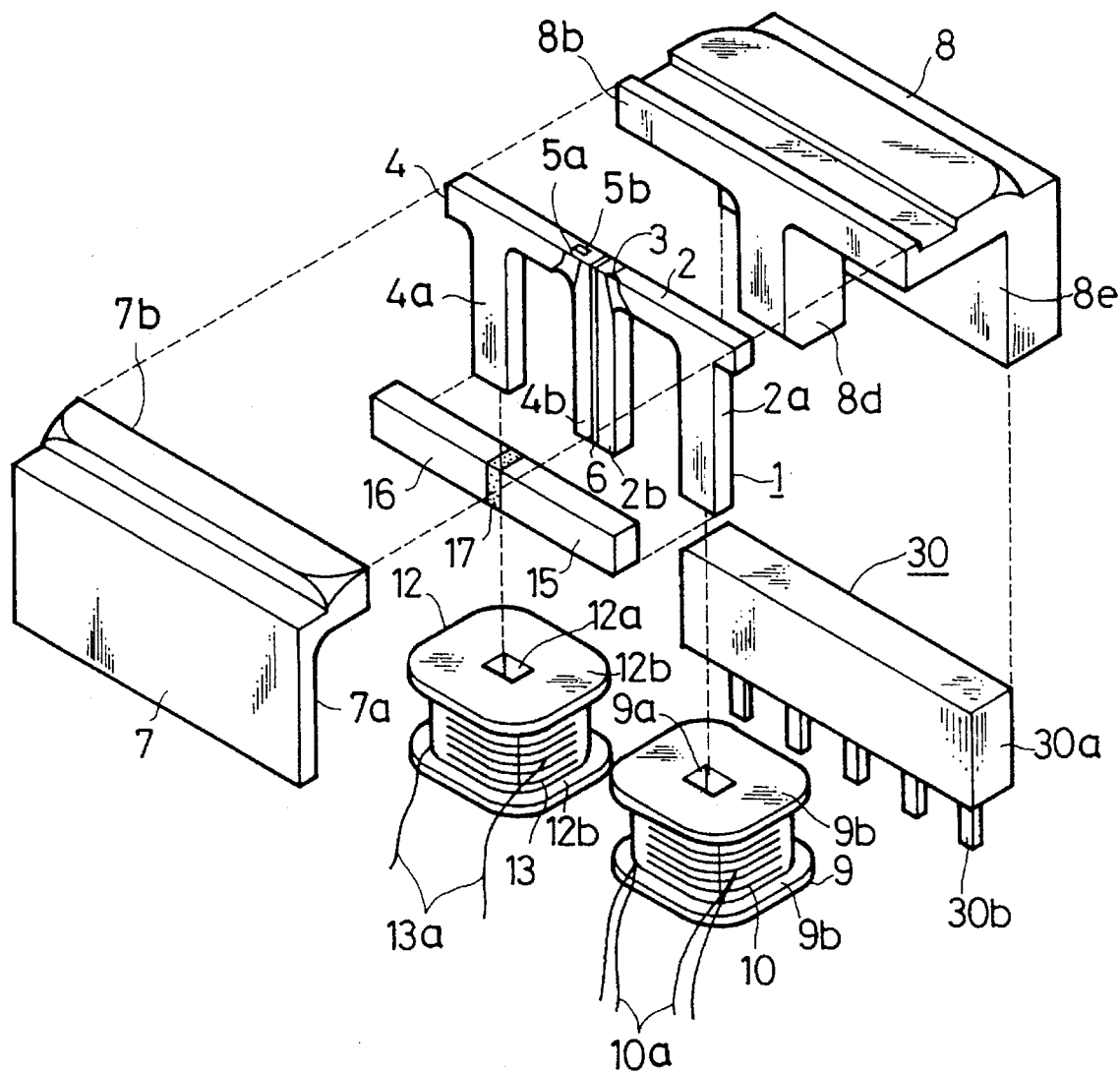
FIG. 8 is an exploded perspective view showing an arrangement of a magnetic head body according to the first embodiment of the present invention.
Figure 9:
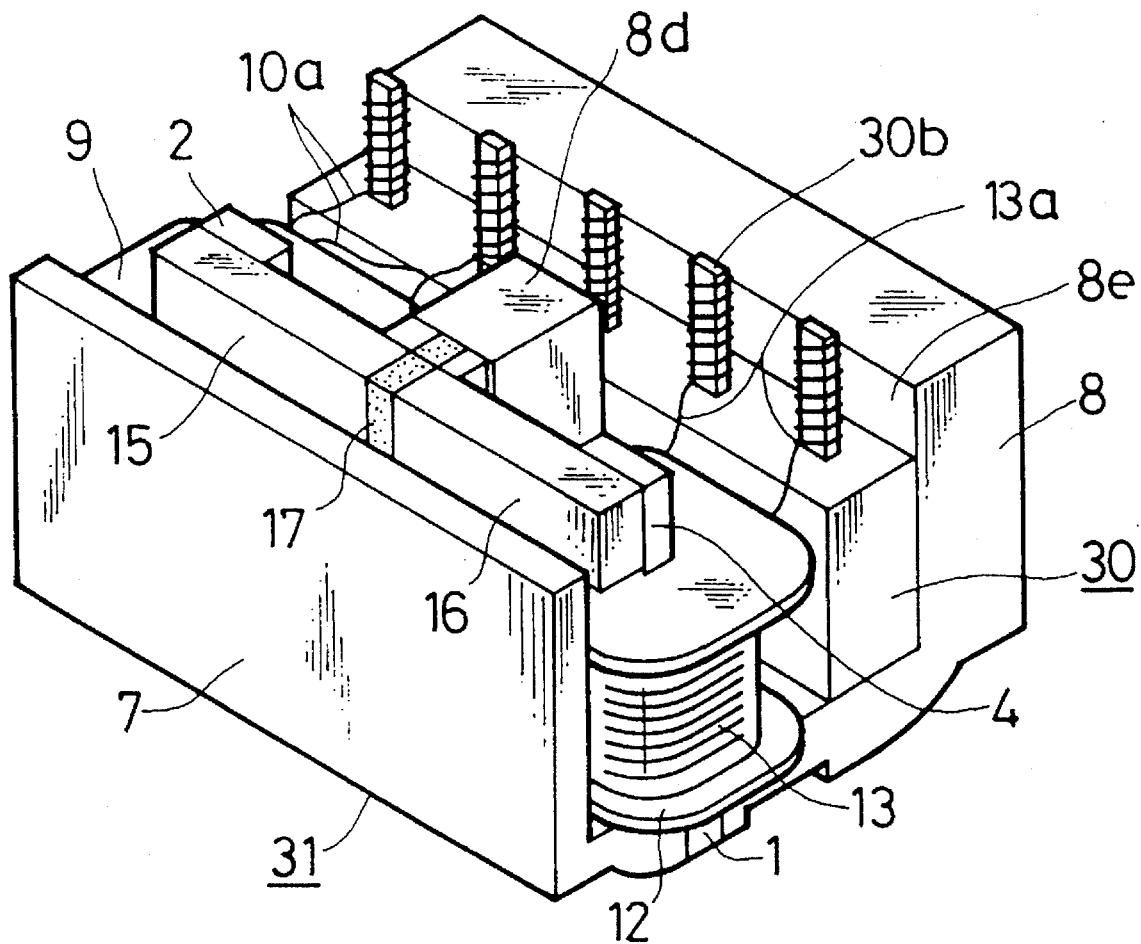
FIG. 9 is a perspective view showing the rear side of the magnetic head body shown in FIG. 8.
Figure 10:
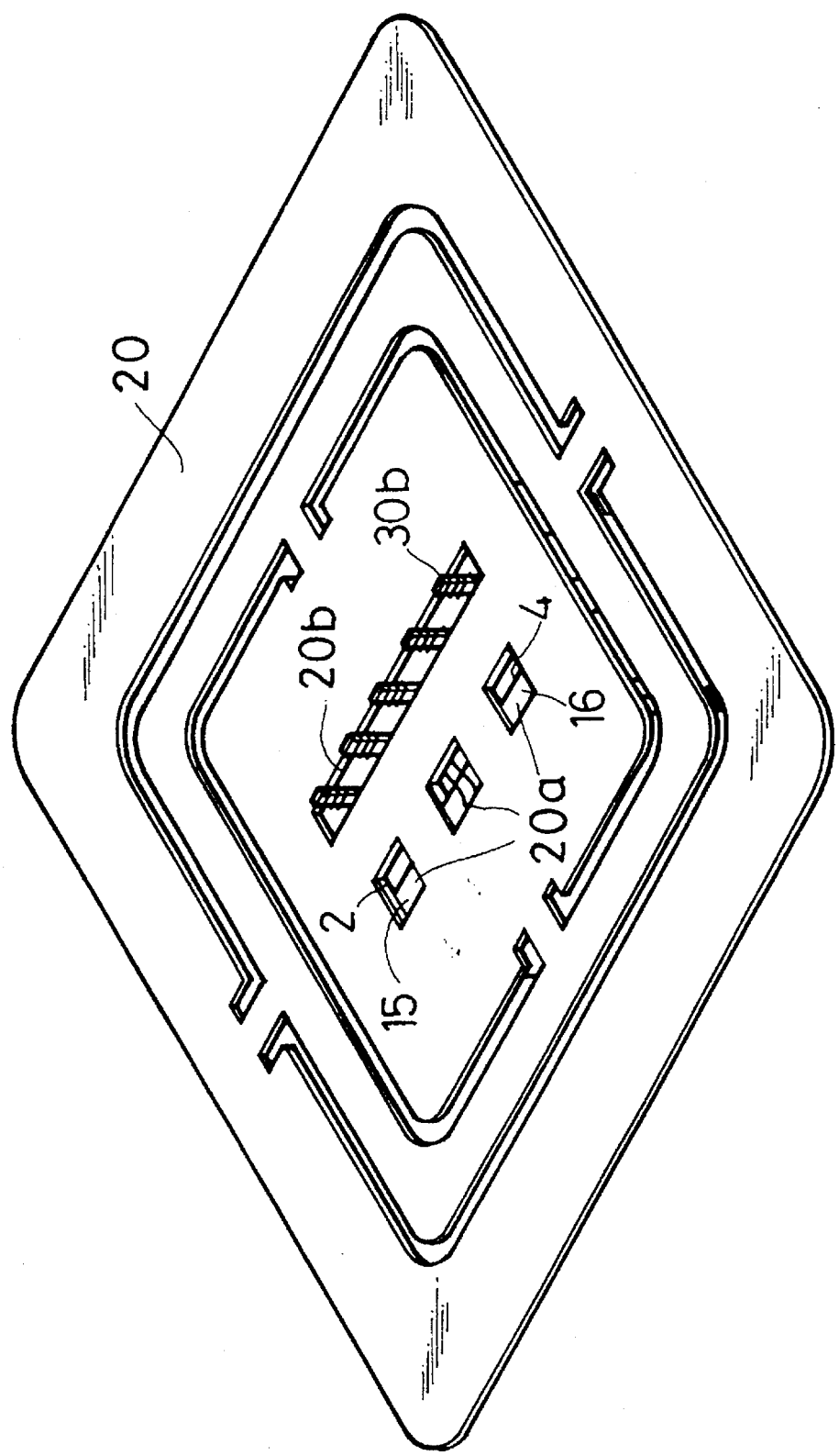
FIG. 10 is a perspective view showing a rear side of the magnetic head shown in FIG. 9, having the magnetic head body to which a support plate is fitted.

FIGS. 8 to 10 are views showing the first embodiment of the present invention. FIG. 8 is an exploded perspective view showing the magnetic head body of the first embodiment. In FIG. 8, a slider 8 is formed with a prismatic portion 8d so that a bonding face 8b of the slider 8 on which the core assembly 1 is bonded is of a T-shape, and a groove 8e for fitting and fixing the terminal assembly 30 is formed inside the prismatic portion 8d. In the groove 8e is arranged a terminal assembly 30 having a terminal holding portion 30a made of an insulating material on which a plurality of terminals 30b are planted. The coil ends 10a and 13a of the coils 10 and 13 are connected to the terminals 30b of the terminal assembly 30, respectively.

FIG. 9 is a perspective view showing the rear face of the magnetic head body 31 thus obtained. In the magnetic head body 31 thus constructed, the volume of the terminal holding portion 30a of the terminal assembly 30 can be made large, i.e., the distance between the neighboring terminals can be made large so that the terminal holding portion 30a can be prevented from being thermally deformed at the time of connecting the coil ends 10a and 13a thereto by soldering. The coil ends 10a and 13a can be connected to one and the same terminal assembly 30, and accordingly it is easy to position a hole formed in a flexible printed board not shown to the terminal 30b and it is unnecessary to form a large hole in the printed board.

FIG. 10 shows the rear side of the magnetic head body 31 according to the first embodiment which is fitted to the support plate 20. In this embodiment, a second escape hole 20b for the terminals 30b formed in the support plate 20 may be provided separately from first escape holes 20a for the rear cores 15 and 16. The dimensions, e.g., the diameter of the escape hole 20b can be made relatively small and accordingly the escape hole 20b can be designed and formed within the space defined by the contour of the magnetic head body 31. This feature is advantageous in designing magnetic heads reduced in size.

The arrangement of the terminals 30b provided on the terminal holding portion 30a of the terminal assembly 31 can be changed properly, if desired, depending on the manner of connecting the output side of the circuit on the flexible printed board to the coil ends.

Second Embodiment

Figure 11:
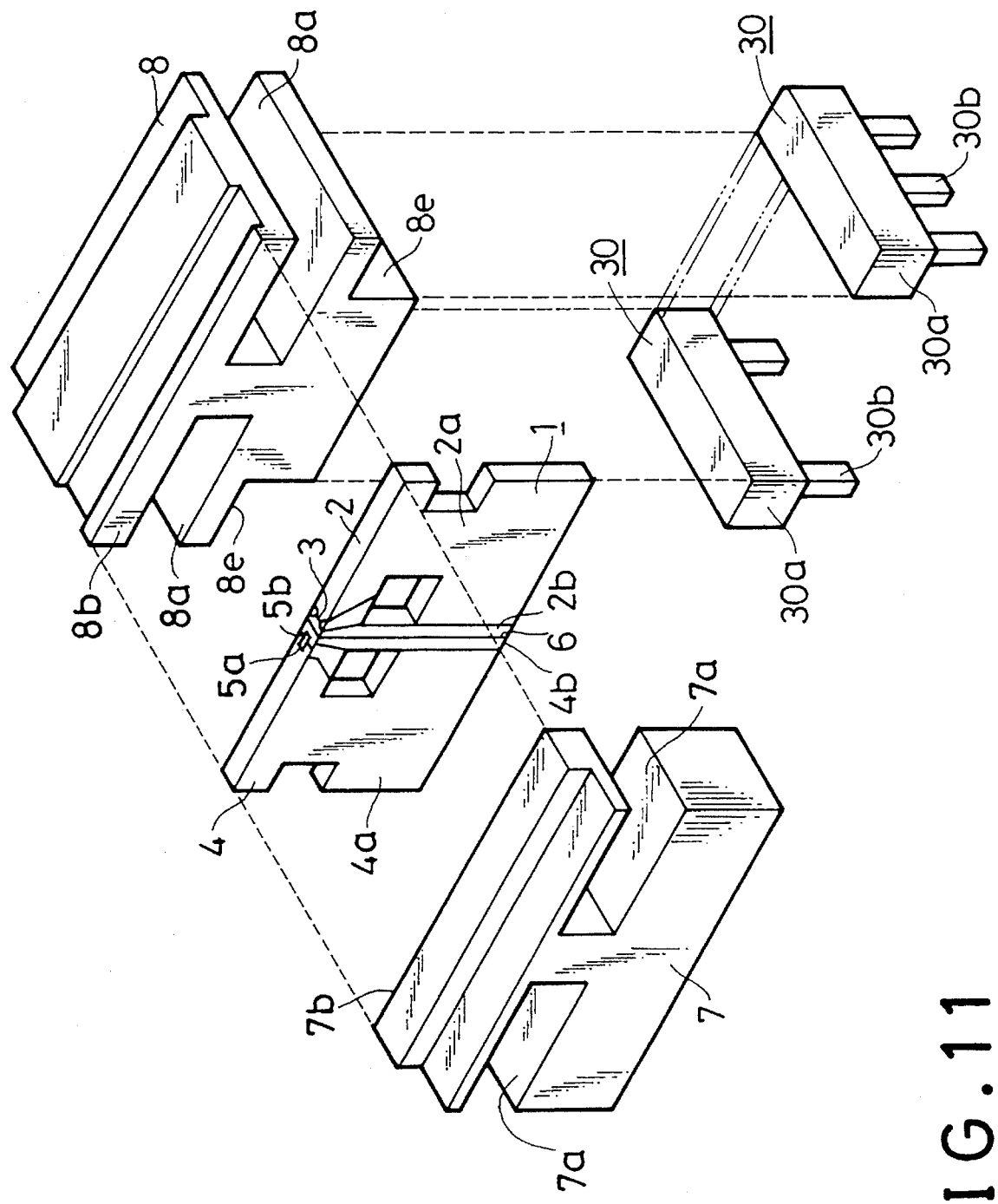
FIG. 11 is an exploded perspective view showing an arrangement of a magnetic head body according to the second embodiment of the present invention.
Figure 12:
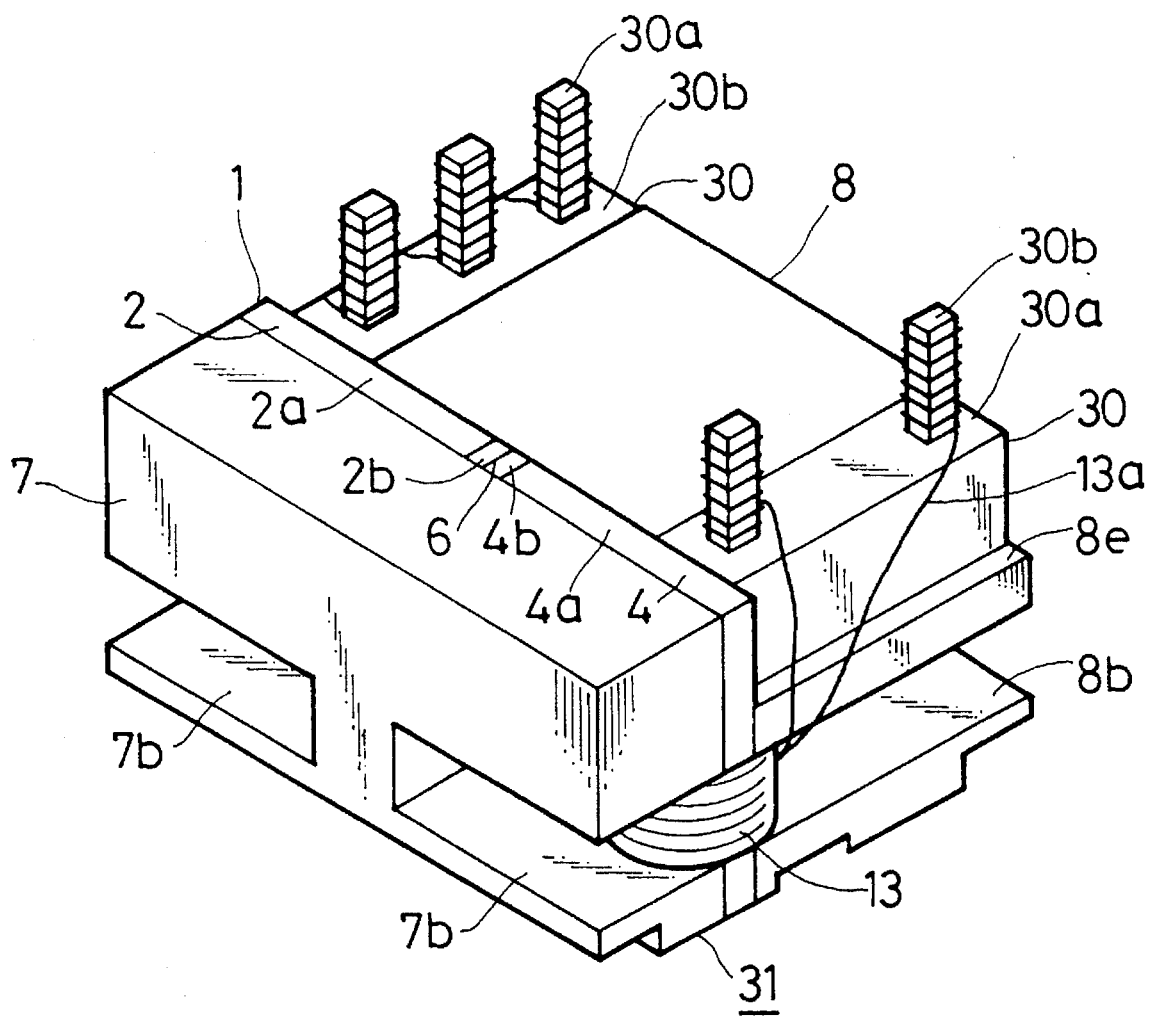
FIG. 12 is a perspective view showing the rear side of the magnetic head body shown in FIG. 11.

FIGS. 11 and 12 show the second embodiment of the present invention. FIG. 11 is an exploded perspective view showing a magnetic head body according to this embodiment. FIG. 12 is a perspective view showing the rear side of the magnetic head body shown in FIG. 11. As shown in FIGS. 11 and 12, in this embodiment, the recording/reproduction magnetic core 2 of the core assembly 1 includes a first core half 2a of a substantially C-shape and a second core half 2b of an I-shape which are bonded through the recording/reproduction gap 3 to arrange a magnetic circuit. The erasing core 4 includes a first core half 4a of a substantially C-shape and a second core half 4b of an I-shape which are bonded through erasing gaps 5a and 5b to arrange a magnetic circuit. The recording/reproduction magnetic core 2 and erasing magnetic core 4 are connected to each other through a filler plate 6 to assemble the core assembly 1.

Sliders 7 and 8 are formed with notches 7a and 8a, respectively, at positions where coils 10 and 13 for the first core halves 2a and 4a, respectively, are wound. The slider 8 is formed with a notches 8e for arranging terminal assemblies 30 therein. Bonding faces 7b and 8b of the sliders 7 and 8, respectively, opposite to the core assembly 1 and the both sides of the core assembly 1 are bonded to each other with adhesive or glass.

In each notch 8e formed in the slider 8 is arranged a terminal assembly 30 having a terminal holding portion 30a on which a plurality of terminals 30b are planted. As shown in FIG. 11, the terminal assembly 30 is arranged in each of the notches 8e against the sides of the recording/reproduction magnetic core 2 and of the erasing magnetic core 4, respectively. The terminal assemblies 30 may be made integral as indicated by the two-dot chain line or may be separate as indicated by the solid line as shown in FIG. 11.

The magnetic head body 31 is assembled by directly winding the coils 10 and 13 around the first core half 2a and the second core half 4a, respectively, and by connecting the coil ends 10a and 13a to the terminals 30a and 30b. In this embodiment, bobbins 9 and 12 as shown in FIG. 8 are not used but the magnetic head body is of a type in which the coil ends 10a and 13a are directly soldered on a flexible printed board (not shown). The soldering on the printed board can be performed easily and the fitting to the support plate can be made in the same manner as in the first embodiment, thus facilitating designing magnetic heads having a reduced size.

Third Embodiment

Figure 13:
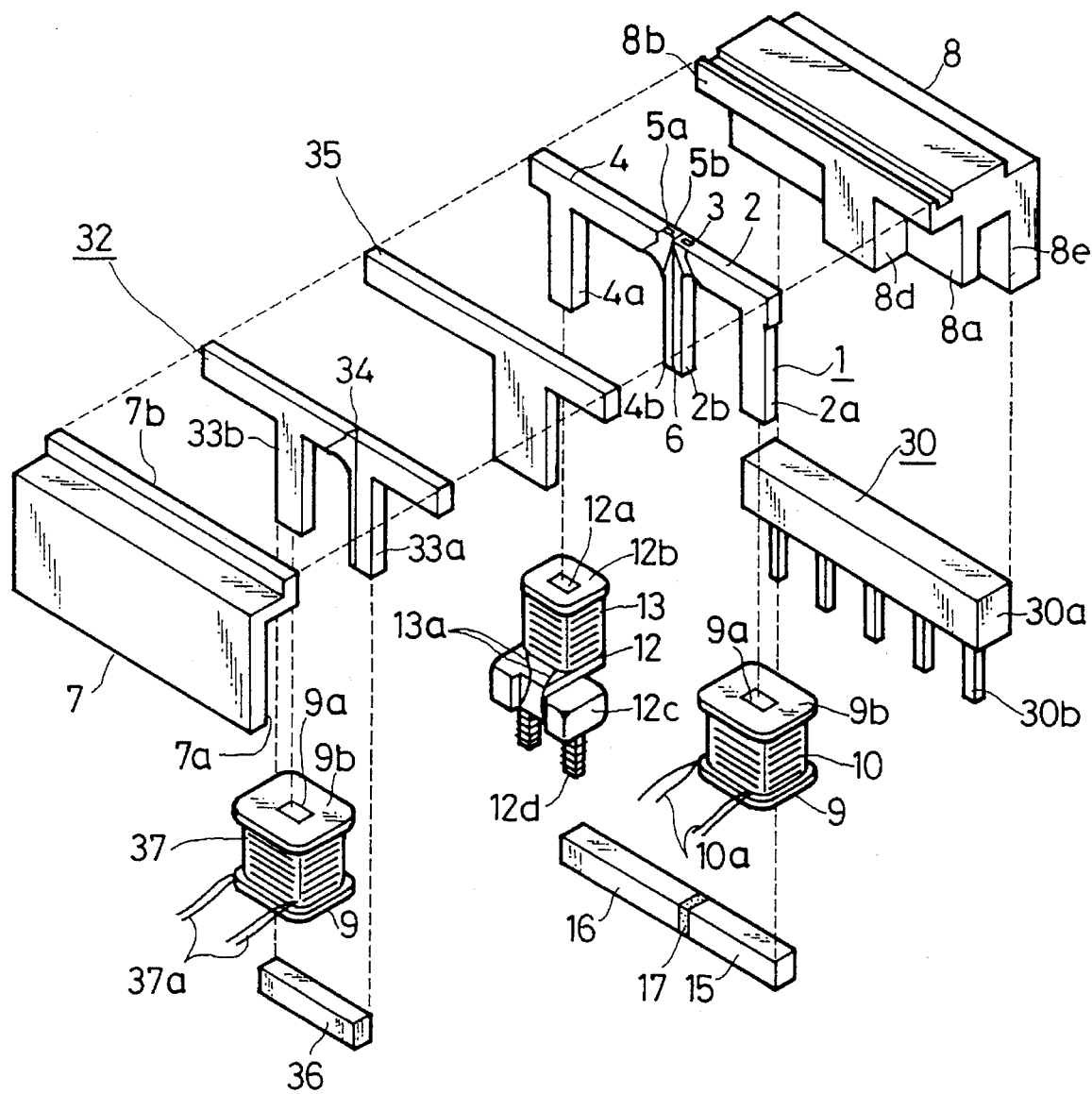
FIG. 13 is an exploded perspective view showing an arrangement of a composite magnetic head body according to the third embodiment of the present invention.
Figure 14:
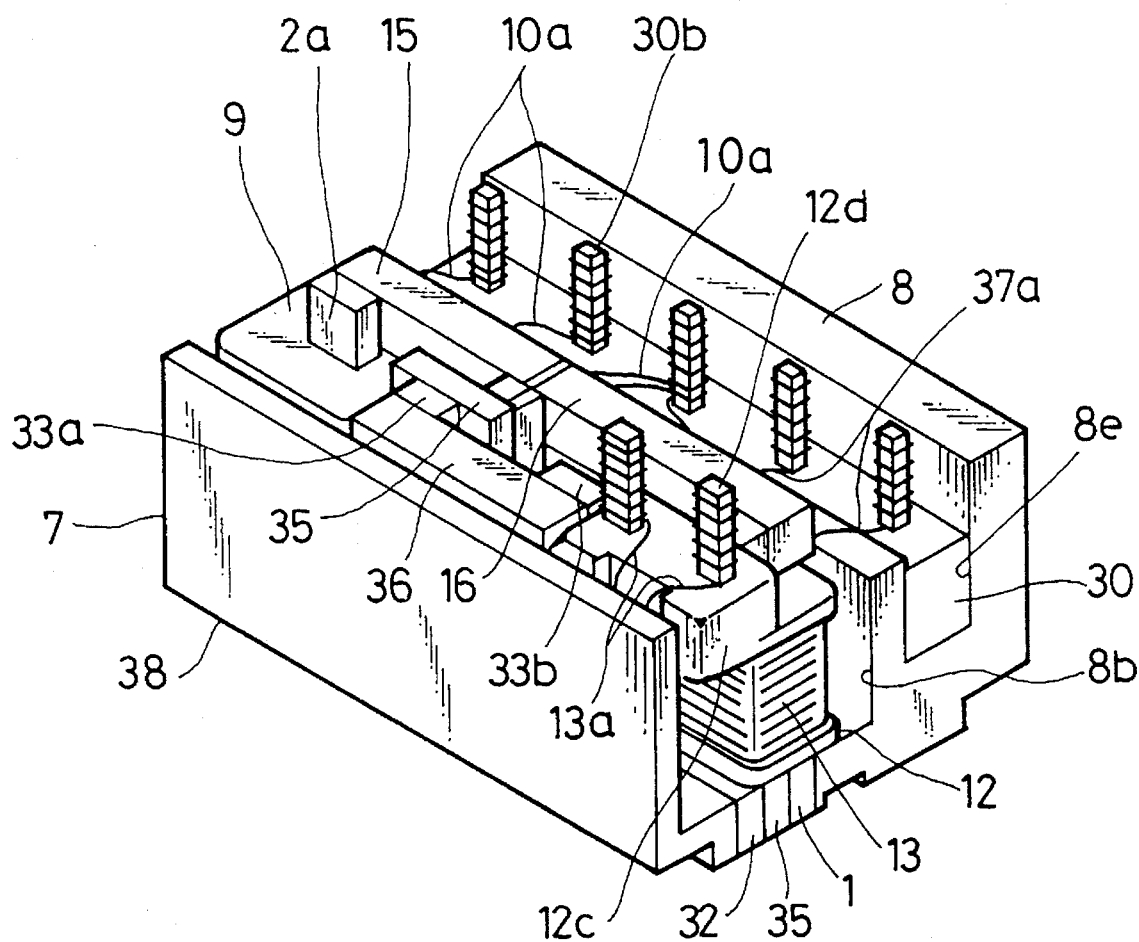
FIG. 14 is a perspective view showing the rear side of the magnetic head body shown in FIG. 13.

FIGS. 13 and 14 shown the third embodiment of the present invention. FIG. 13 is an exploded perspective view showing a magnetic head body according to this embodiment. FIG. 14 is a perspective view showing the rear side of the magnetic head body shown in FIG. 13. As shown in FIGS. 13 and 14, in this embodiment, the magnetic head body has a core assembly 1 the same as that shown in FIG. 8 and a high track density recording/reproduction magnetic core assembly 32 which includes a first core half 33a of a substantially L-shape and a second core half 33b of a substantially T-shape, each having a track density and line recording density different from those of the core assembly 1 and bonded through a recording/reproduction gap 34. The core assembly 1 and the high track density recording/reproduction core assembly 32 are bonded to each other through a filler plate 35, and sliders 7 and 8 made of a non-magnetic material are bonded to both sides of the resulting assembly, whereby the core assemblies 1 and 32 are remote from each other by a predetermined track pitch.

The core assembly 1 is of a so-called tunnel erasure system and can be used, for example, at a track density of 135 TPI and at a maximum line recording density of 9 to 17 KBPI. The high track density core assembly 32 has a track density of 200 TPI or more, and a maximum recording density of 25 to 50 KBPI. Those having higher track densities require introduction of a tracking servo system for feeding the tracks, and therefore the one used here is of a type of recording/reproduction core only.

The core half 2a of the core assembly 1 is fitted in a coil bobbin 9a around which the coil 10 for recording/reproduction is wound. On the other hand, a terminal holding portion 12c is integrally molded in a coil bobbin 12 around which the coil 13 for erasing is wound. In the core half 4a is fitted a so-called terminal-attached coil bobbin 12 including a terminal holding portion 12c having planted thereon a plurality of terminals 12d to which the coil end 13a of the coil 13 is connected. Thereafter, the respective rear ends of the core halves 2a and 2b, and of the core halves 4a and 4b of the core assembly 1 are bonded to the rear cores 15 and 16, respectively, through a filler plate 17. On the other hand, in the core half 33b of the high track density core assembly 32 is fitted a coil bobbin around which a recording/reproduction coil 37 is wound and a rear core 36 is bonded to the rear ends of the core halves 33a and 33b to magnetically connect them.

The part of the slider 8 shown in FIG. 13 has its lower part cut out upward and this cut out part serves as a groove 8e for inserting therein the terminal assembly 30. In the groove 8e is arranged the terminal assembly 30 including the terminal holding portion 30a having planted thereon a plurality of the terminals 30b, and the ends 10a and 37a of the above-described recording/reproduction coils 10 and 37 are connected thereto by soldering or the like to assemble a composite magnetic head body 38.

In the case of the composite magnetic head body 38 according to this embodiment, the recording/reproduction coils 10 and 37 have 8 ends occupied by the coil ends 10a and 37a only, and a total of 10 ends inclusive of those occupied by the ends 13a of the erasing coil 13. A large number of man-hour is required for connecting these coil ends to a flexible printed board (not shown) and a problem arises that errors tend to occur in the wiring. However, in such a terminal arrangement as described in this embodiment, the terminal assembly 30 can be made large and accordingly the number of terminals can be increased, resulting in that connection of the terminals is easier and less errors occur in the wiring, which causes less damage at the time of soldering to the flexible print board and makes it easier to design circuitry. In this embodiment, the bobbins 9 around which the recording/reproduction coils 10 and 37 are wound are fitted to the core halves 2a and 33b, followed by connecting the bobbins to the terminals 30b. In this case, the connection can be performed using a jig which properly positions or aligns the positions of the core halves 2a and 33b and of the terminal assembly 30, resulting in that damages of the core can be prevented reliably. In addition, the soldering can be performed simultaneously at one time using a soldering bath after connecting the terminals 30b to the coil ends 10a and 37a, which can reduce the number of man-hour for connecting the coil ends 10a and 37a to a greater extent.

Fourth Embodiment

Figure 15:
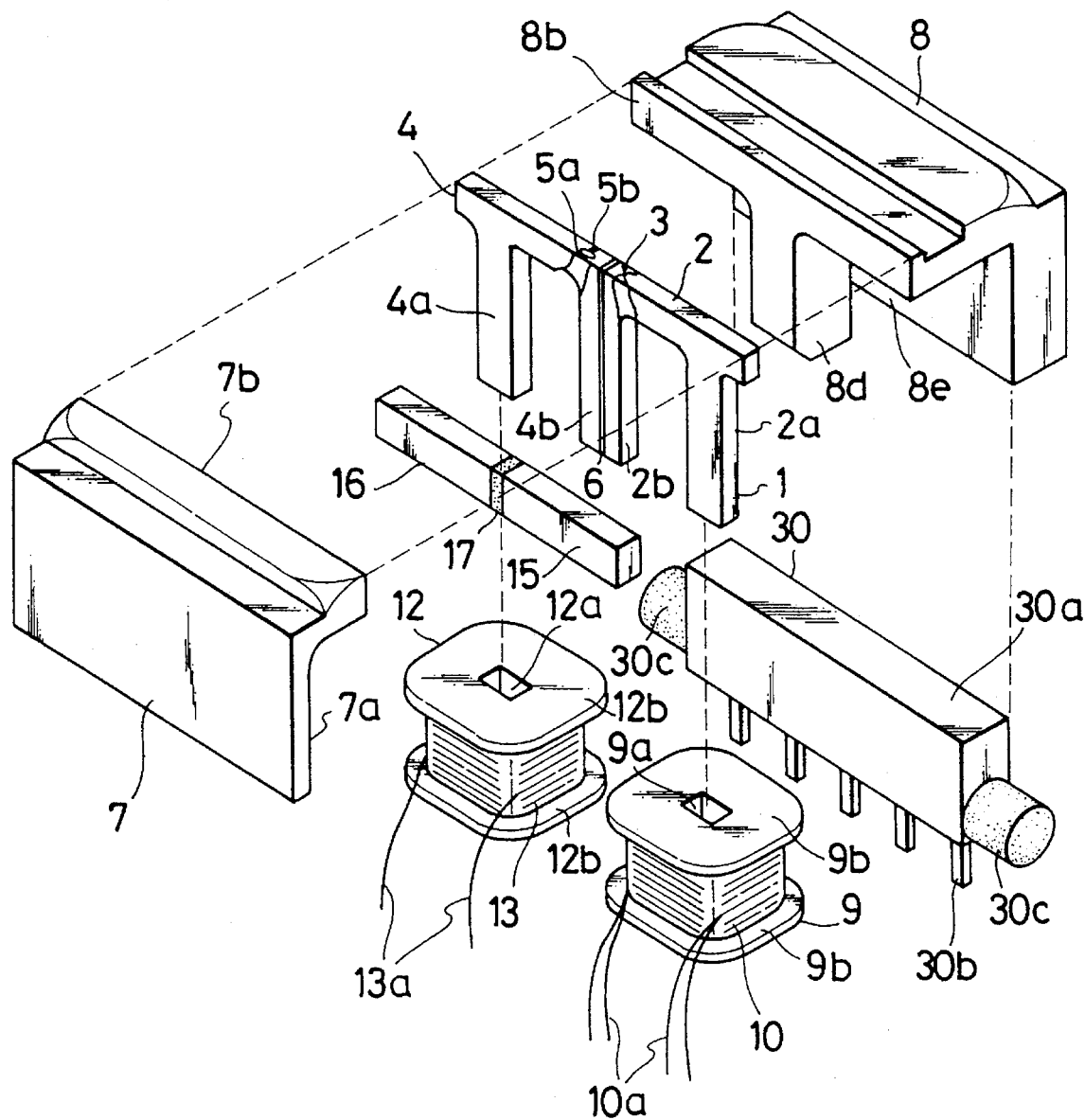
FIG. 15 is an exploded perspective view showing an arrangement of a composite magnetic head body according to the fourth embodiment of the present invention.
Figure 16:
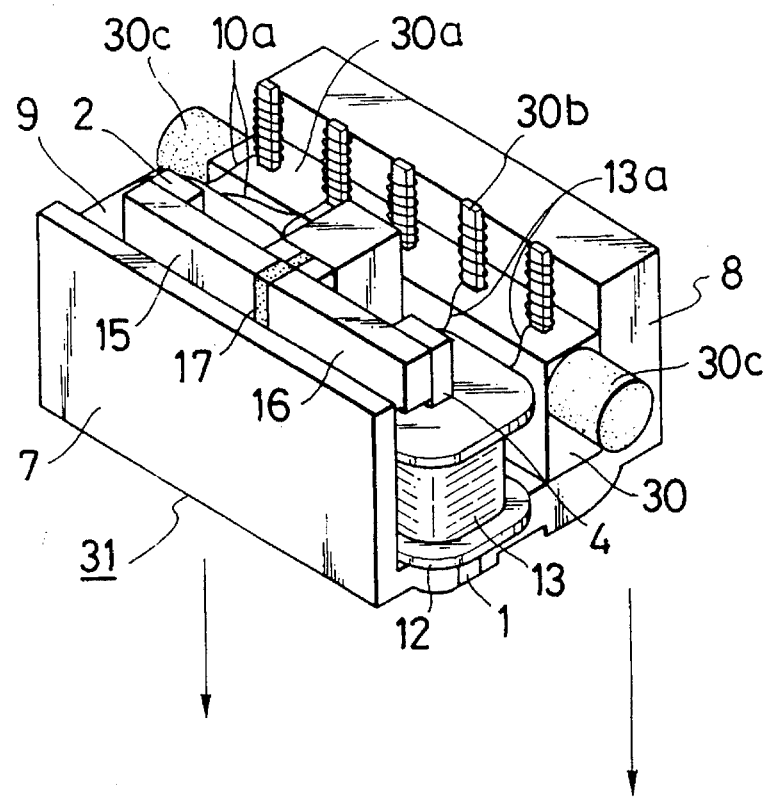
FIG. 16 is a perspective view showing the magnetic head body illustrated in FIG. 15 and a shield ring.
Figure 16:
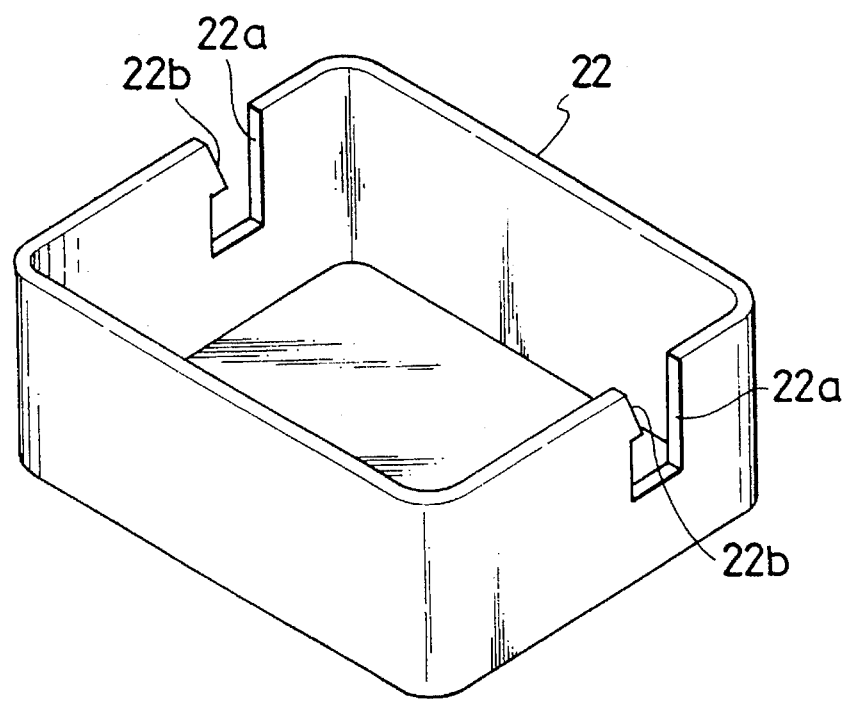
Figure 17:
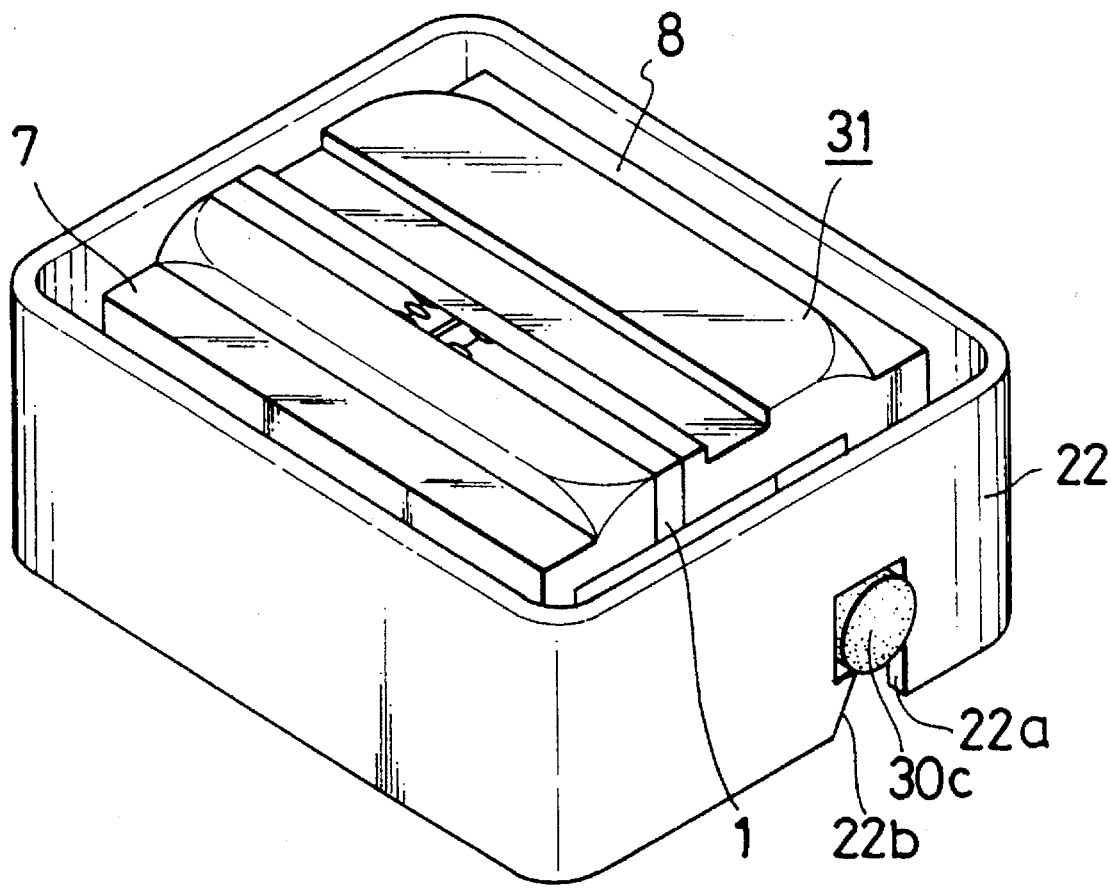
FIG. 17 is a perspective view showing the magnetic head body shown in FIG. 16, to which the shield ring is fitted.

FIGS. 15 to 17 show an arrangement of the magnetic head for a floppy disc drive according to the fourth embodiment of the present invention. FIG. 15 is an exploded perspective view showing the magnetic head body of the magnetic head.

As shown in FIG. 15, a terminal holding element 30a is formed on both sides 30c thereof in the form of a cylinder for engaging a shield ring 22 therewith and on a mid portion thereof in the form of a prism as explained later on.

Assembly of the magnetic head body 31 according to this embodiment will be explained below. On both side faces of the core assembly 1 are bonded the sliders 7 and 8, the front cores 2a and 4a are fitted to the coil bobbins 9 and 12, respectively, and rear cores 15 and 16 are bonded to the rear end of the core assembly 1. The terminal assembly 30 is fitted in the groove 8e of the slider 8 and fixed thereto by bonding. Further, each of the terminals 30b in the fixed terminal assembly 30 is wound around and connected to each of the coil ends 10a and 13a of the coils 10 and 13, respectively.

As described above, the magnetic head body 31 shown in FIG. 16 is assembled. On both sides, i.e., right and left hand sides in FIG. 16, of the magnetic head body 31 protrudes an end portion 30c of the terminal holding element 30a of the terminal assembly 30.

On the other hand, as shown in FIG. 16, the shield ring 22 in the form of a prism is formed with notches 22a at portions corresponding to the end portions 30c of the terminal assembly 30. The notches 22a are substantially in the form of a rectangle, having on one side of each of the notches an engagement portion 22b which protrudes in the form of a triangle. The distance between the top of the engagement portion 22b and the side face of the opposing notch 22a is made slightly smaller in size than the diameter of the end portion 30c of the terminal assembly 30.

The shield ring 22 and at least one of the terminal holding elements 30a may have a certain degree of elasticity.

By inserting the magnetic head body 31 in the shield ring 22 in the direction indicated by arrows in FIG. 16 and elastically deforming the shield ring 22 or the end portion 30c of the terminal holding element 30a to press it into the notch 22a, the end portion 30c gets over the engagement portion 22b so that the engagement portion 22b can be engaged with the end 30c portion. A a result, the shield ring 22 is connected to the end portion 30c in an engaged state, and the shield ring 22 is fitted to the magnetic head body 31 as shown in FIG. 17.

Figure 2:
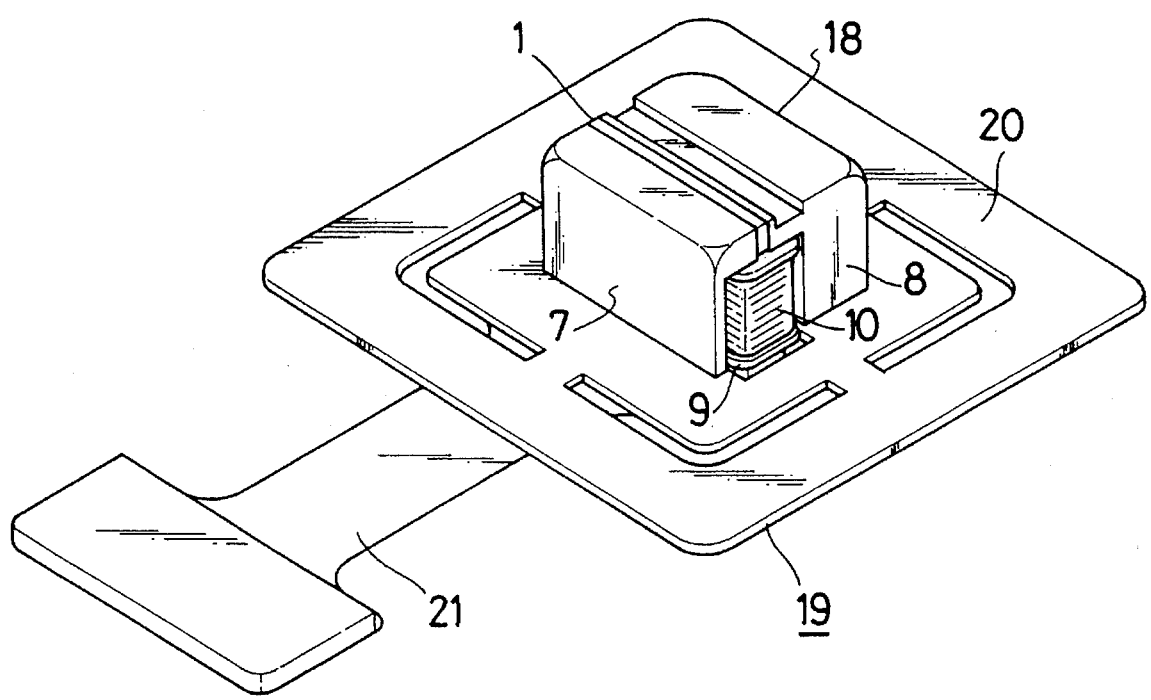
FIG. 2 is a perspective view showing a front side of the magnetic head shown in FIG. 1, having the magnetic head body to which a support plate and a printed board are fixed.
Figure 3:
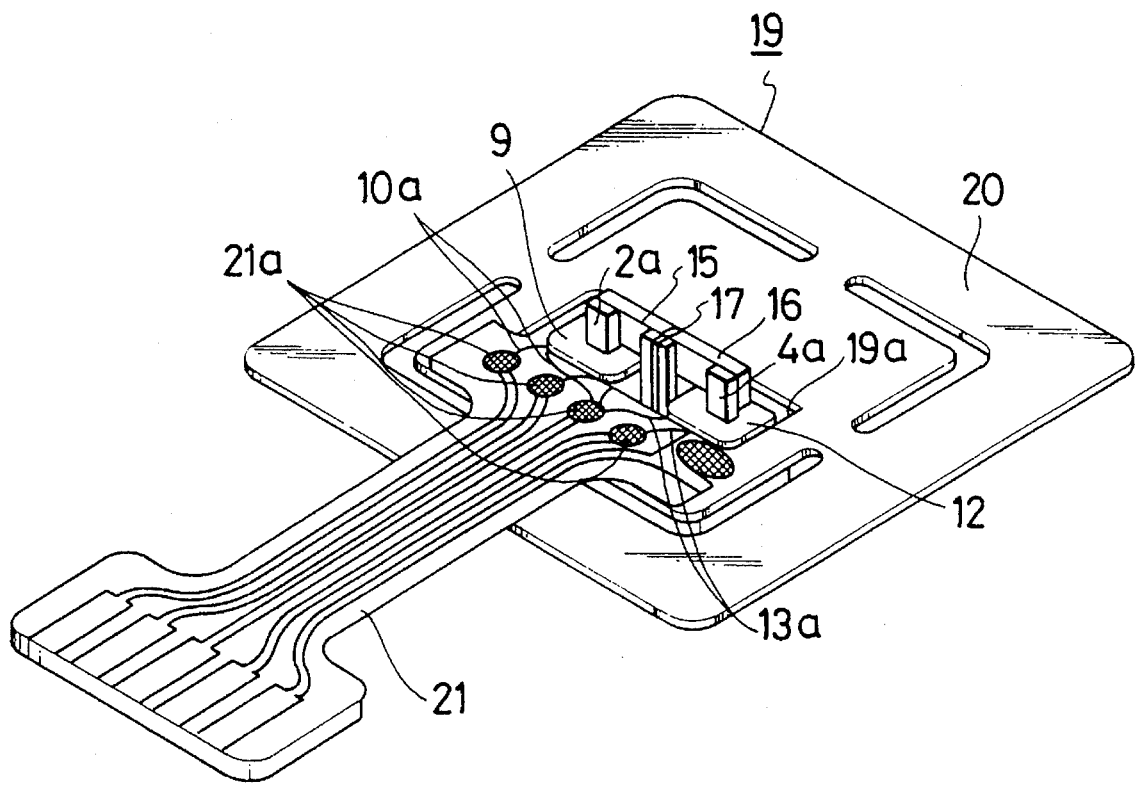
FIG. 3 is a perspective view showing the rear side of the magnetic head shown in FIG. 2.
Figure 4:
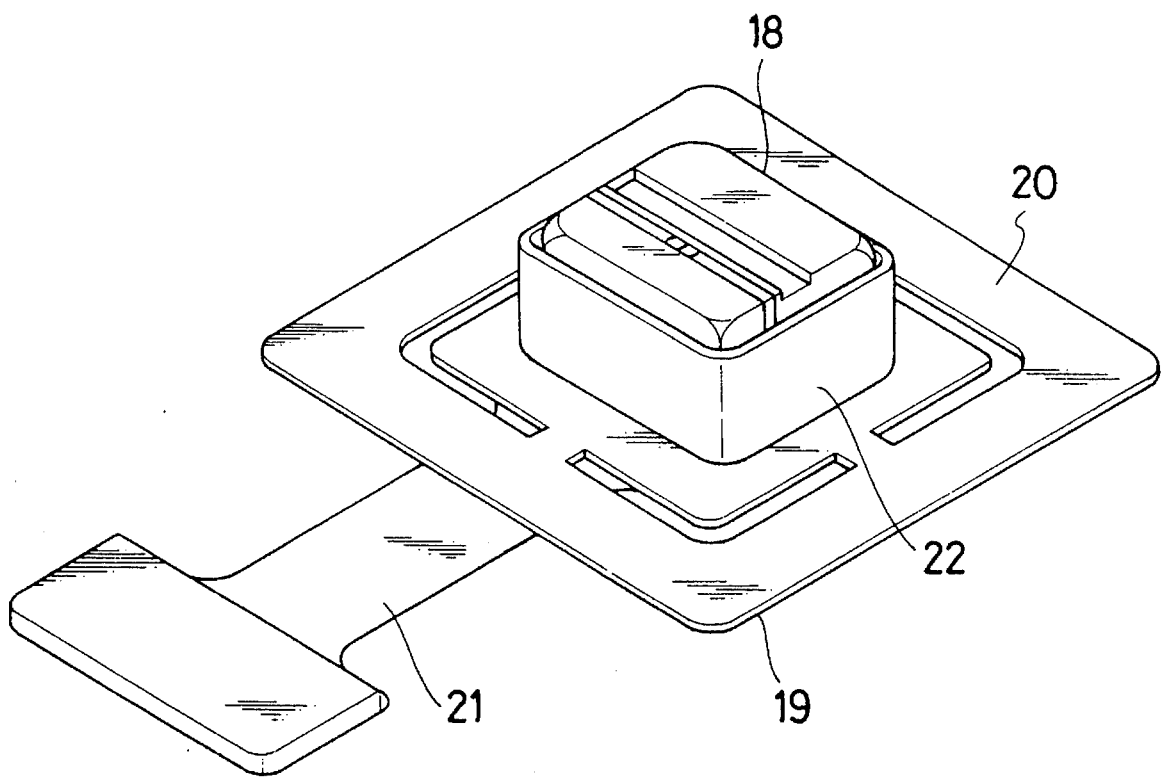
FIG. 4 is a perspective view showing the magnetic head shown in FIG. 2, to which a shield ring is fitted.
Figure 5:
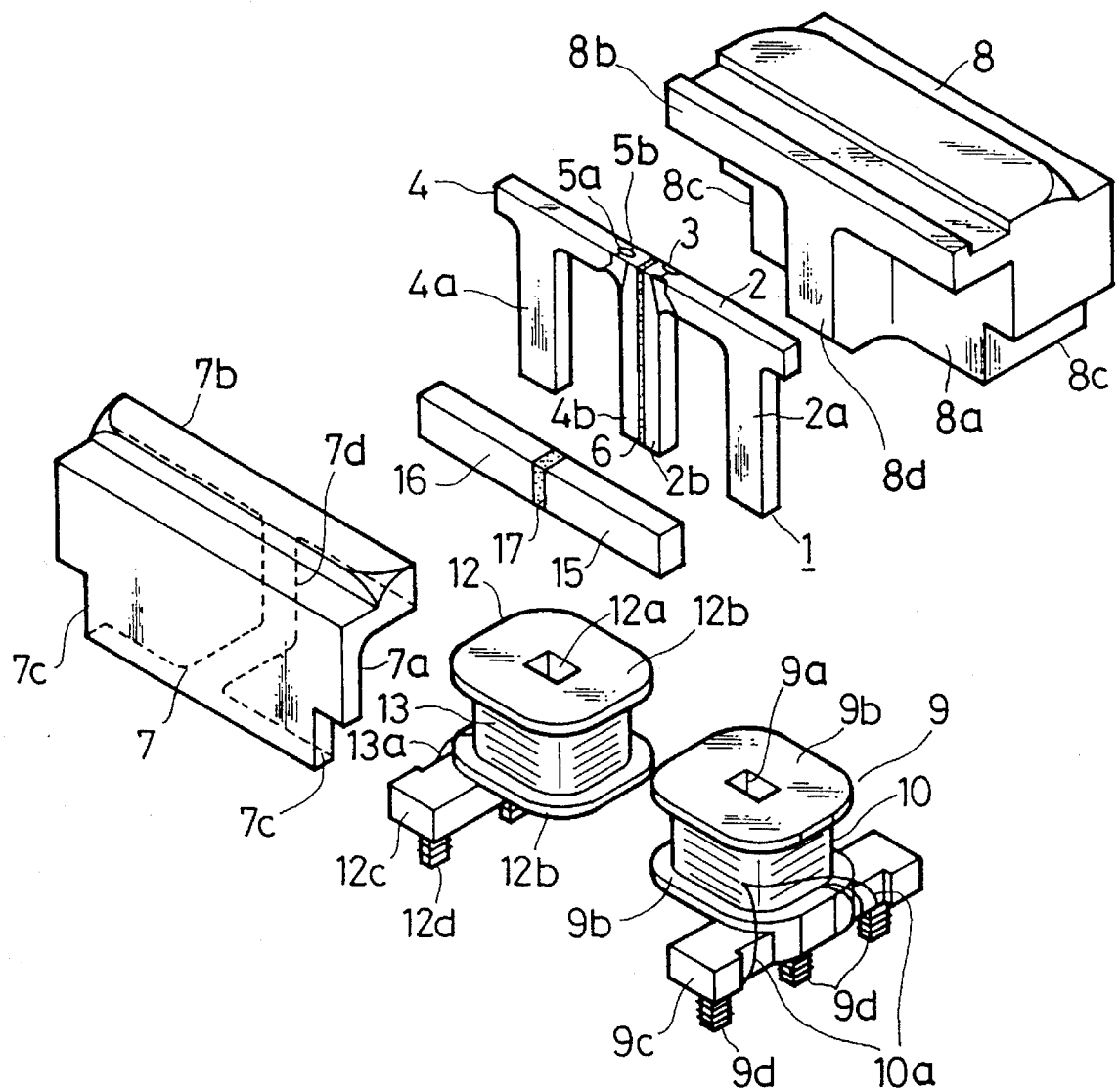
FIG. 5 is an exploded perspective view showing an arrangement of another conventional magnetic head body.
Figure 6:
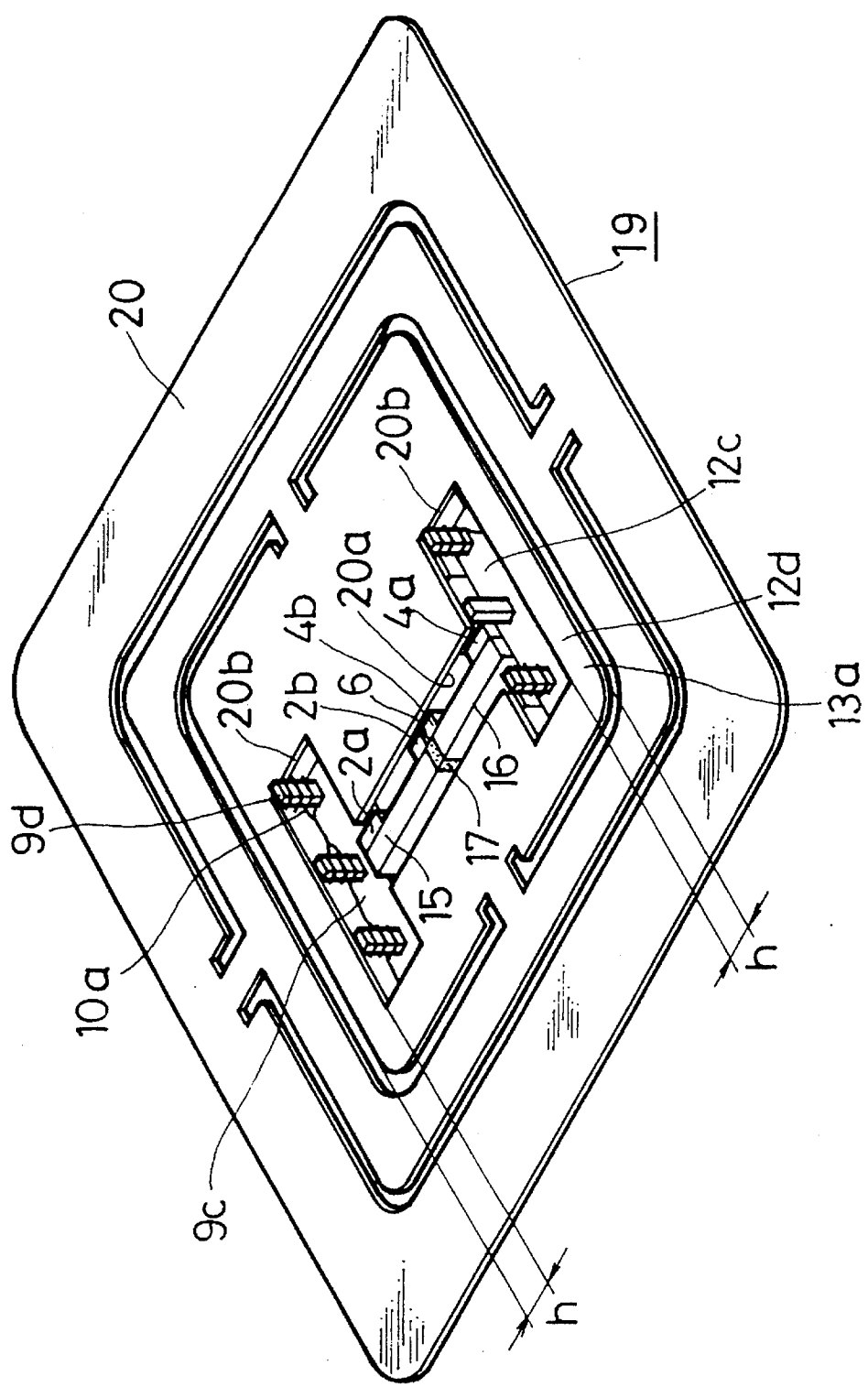
FIG. 6 is a perspective view showing a front side of the magnetic head shown in FIG. 5, having the magnetic head body to which a support plate is fitted.
Figure 7:
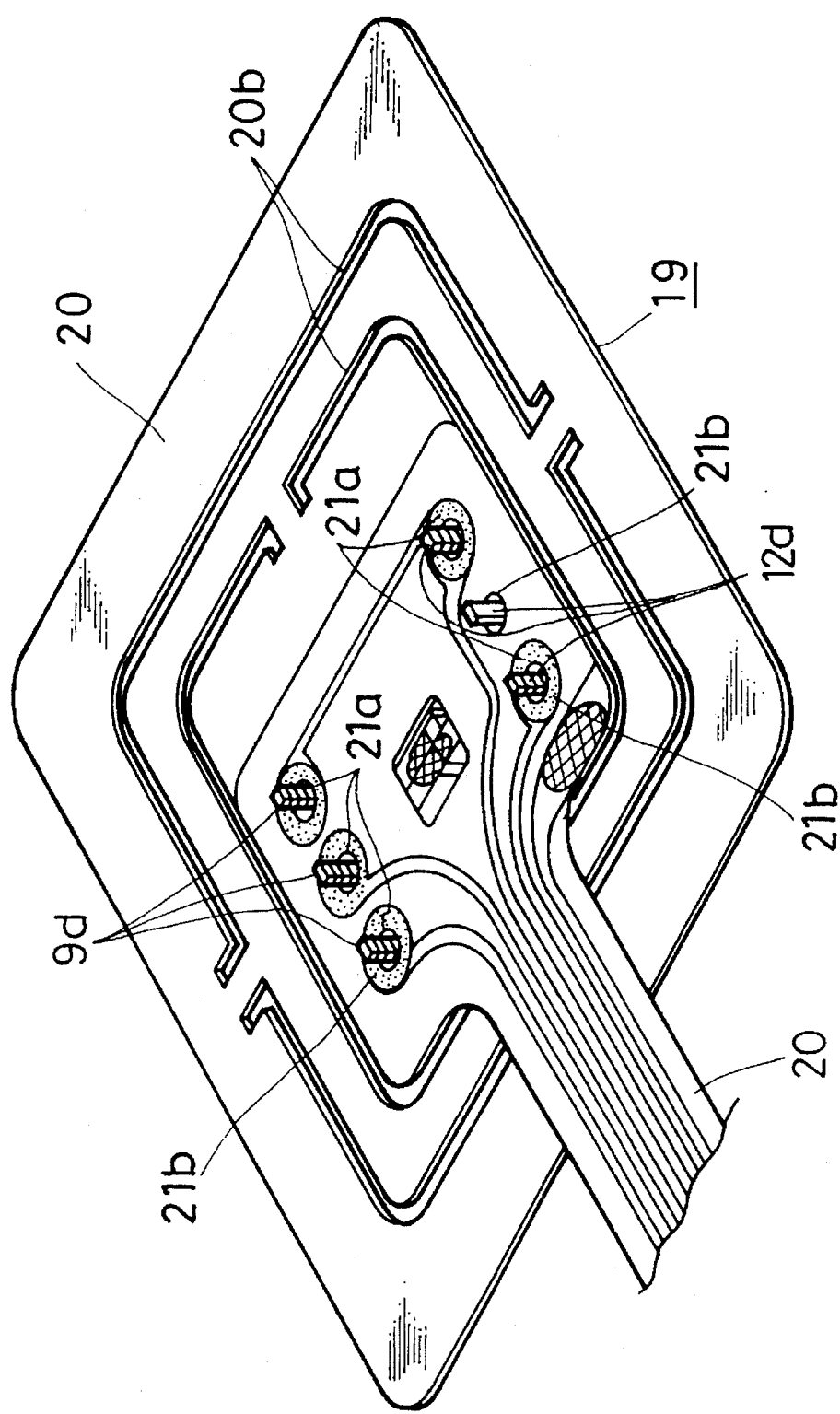
FIG. 7 is a perspective view showing the rear side of the magnetic head shown in FIG. 5.

The magnetic head body 31 to which the shield ring 22 has been fitted as described above is fixed to the support plate 20 as shown, for example, in FIGS. 2 and 3, and the flexible printed board is connected thereto to assemble a magnetic head. Then, the terminals 30b of the terminal assembly 30 are each soldered to a lead wire pattern on the printed board 21 (as shown in FIG. 3, for example) to connect each of the coil ends 10a and 13a to the lead wire pattern on the printed board.

According to this embodiment as explained above, the connection of the coil ends 10a and 13a can be performed easily because the ends 10a and 13a are wound around the terminals 30b of the terminal assembly 30 and the terminals 30b are soldered on the printed board 21. This makes it possible to increase the distance between the terminals 30b and also makes it unnecessary to perform the positioning of the coil ends.

According to this embodiment, the fitting of the shield ring 22 can be performed easily by simply pressing the magnetic head body 31 terminal end portion 30c into the notch as described above. Therefore, the steps of manufacturing magnetic heads can be simplified and cost can be reduced accordingly.

According to this embodiment, in a state in which the shield ring 22 is fitted to the magnetic head body 31, the engagement portion 22b serves as a construction for preventing dropping out of the terminal portion 30c. Therefore, the connection between the shield ring 22 and the terminal portion 30c is firm, thus preventing the dropping off of the shield ring 22 reliably.

The shield ring 22 may be fitted to the magnetic head body 31 after fixing the magnetic head body 31 to the support plate 20 and connecting thereto the printed board 21.

The shield ring 22 fitted to the magnetic head body 31 may further be bonded to the magnetic head body 31 and the support plate 20. In this case, the bonding is performed mainly for the purpose of preventing vibration of the shield ring 22. Sufficient bonding effects can be obtained by coating adhesive on at least one position of, for example, the connection portion of the terminal end portion 30c and the shield ring 22 and the contact portion between the shield ring 22 and the support plate 20, and no care has to be taken of the amount of the adhesive or the space for bonding.

Fifth to Ninth Embodiments

A connection structure between the shield ring 22 and the terminal assembly 30 for connecting the shield ring 22 to the terminal holding element 30a of the terminal assembly 30 to fit it to the magnetic head body 18 is not limited to those described above. For example, structures according to other embodiments shown in FIGS. 18–23 may also be used. Hereinafter, explanation will be made of those structures.

Figure 18:
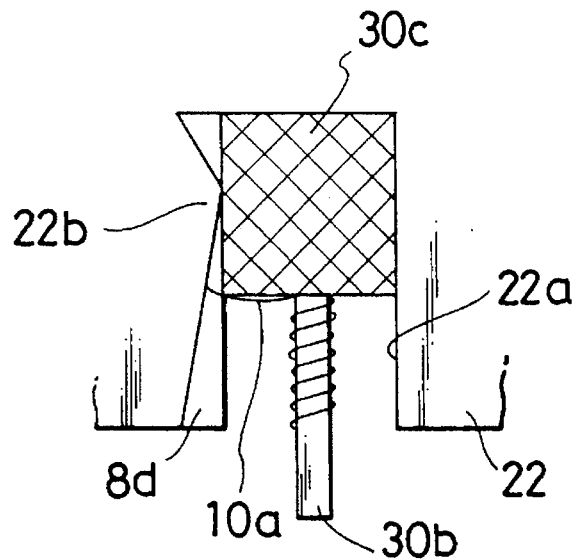
FIG. 18 is a front elevational view showing a connection portion of a shield ring to a magnetic head body according to the fifth embodiment of the present invention.
Figure 19:
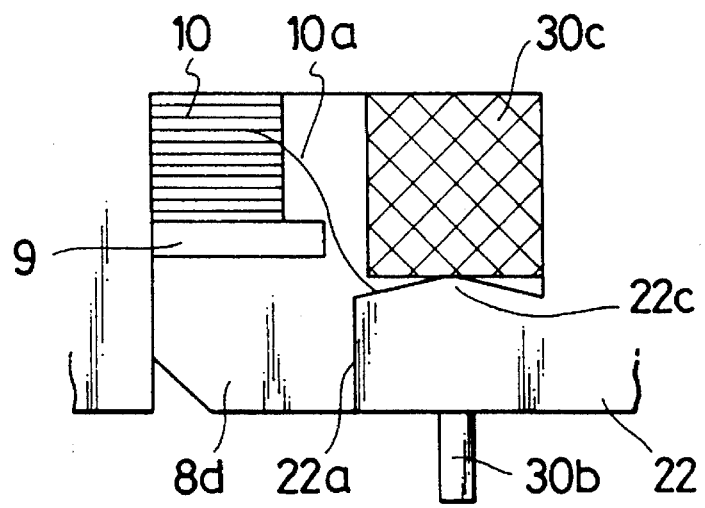
FIG. 19 is a front elevational view showing a connection portion of a shield ring to a magnetic head body according to the sixth embodiment of the present invention.

FIGS. 18 and 19 show two examples of a connection portion between the magnetic head body and the shield ring in which the cross sectional shape of the terminal portion 30c of the terminal holding element 30a of the terminal assembly 30, i.e., the shape of the cross section of the terminal holding element 30a in a plane perpendicular to the longitudinal direction thereof, is a rectangle and the shape of the notch 22a of the shield ring 22 is different from the shape of the notch 22a in the fourth embodiment described above.

In the fifth embodiment as shown in FIG. 18, the notch 22a is substantially rectangular, having formed on one side thereof a convex portion 22b protruding in the form of a mountain. The width of the notch 22a in the convex portion 22b is slightly smaller than the width of the terminal portion 30c. This construction allows the terminal portion 30c of the terminal assembly 30 to be pressed into the notch 22a by elastic deformation of the terminal portion 30c or the shield ring 22. This makes the convex portion 22b bore somewhat into the the terminal portion 30c so that the shield ring 22 can be connected to the terminal portion 30c firmly and fitted to the magnetic head body.

In the sixth embodiment shown in FIG. 19, the notch 22a is formed in a substantially L-shape, and the convex portion 22c in the form of a mountain is formed in the interior of the notch 22a at its lower side. The height or depth of the notch 22a at the convex portion 22c is slightly smaller than that at the terminal portion 30c. This construction makes it possible to press the terminal portion 30c of the terminal assembly 30 into the notch 22a to the right after inserting the terminal portion 30c upward into the notch 22a. As a result, the convex portion 22c bores into the terminal portion 30c so that the shield ring 22 can be fixed and fitted to the terminal portion 30c firmly.

Figure 20:
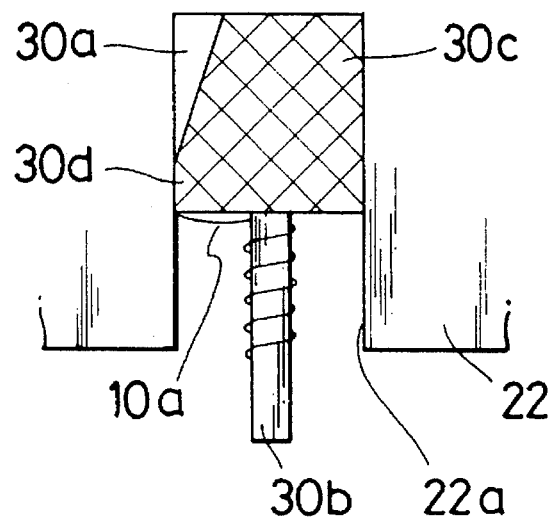
FIG. 20 is a front elevational view showing a connection portion of a shield ring to a magnetic head body according to the seventh embodiment of the present invention.
Figure 21:
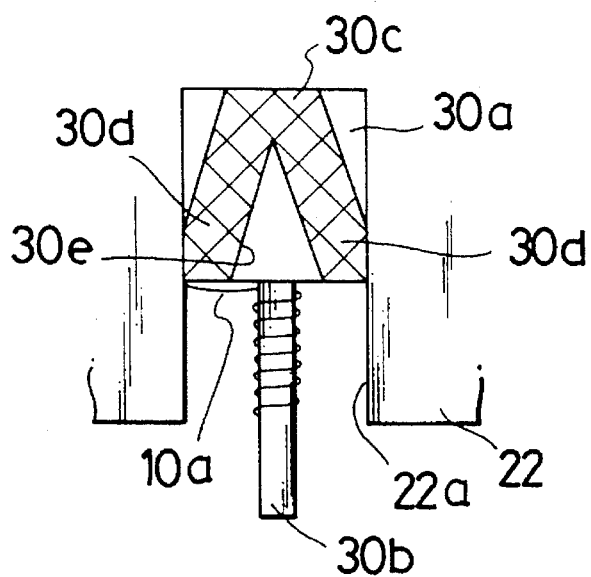
FIG. 21 is a front elevational view showing a connection portion of a shield ring to a magnetic head body according to the eighth embodiment of the present invention.

Next, FIGS. 20 and 21 show two examples of a connection portion between the magnetic head body and the shield ring 22 in which the shape of the notch 22a of the shield ring 22 is rectangular and the cross sectional shape of the terminal portion 30c of the terminal holding element 30a of the terminal assembly 30 is different than described above.

In the seventh embodiment as shown in FIG. 20, the cross section of the terminal portion 30c is of a trapezoidal shape, whose right hand side as shown in FIG. 20 is vertical and whose left hand side as shown in FIG. 20 is slanted and has a protruding convex portion 30d. The width of the terminal portion 30c at the top of the convex portion 30d is made slightly larger than the width of the notch 22a. This construction makes it possible to press the terminal portion 30c into the notch 22a and have it fitted thereto by elastic deformation of the shield ring 22 or the terminal portion 30c. As a result, the convex portion 30d bores into the periphery of the notch 22a to firmly connect and fit the shield ring 22 to the terminal assembly 30.

In the eighth embodiment as shown in FIG. 21, the terminal portion 30c has a triangular groove 30e and has a cross section of an inverted V-shape and is easily to be elastically deformed. The maximum width of the terminal portion 30c, i.e., the width at the convex portions 30d on the right hand side and left hand side thereof is set up to be slightly larger than the width at the notch 22a. This construction makes it possible to press the terminal portion 30c into the notch 22a and have it fitted thereto by elastic deformation thereof. As a result, the convex portion 30d bores into the periphery of the recess 22a to firmly connect the shield ring 22 to the terminal assembly 30 and fit it to the magnetic head body.

In each of the fifth to eighth embodiments as shown in FIGS. 18–21, the shield ring 22 can be fitted to the magnetic head body easily and reliably as in the case of the fourth embodiment, thus reliably preventing dropping off of the shield ring 22. Needless to say, the shapes of the terminal portion 30c and of the recess 22a are not limited to those described above.

Figure 22:
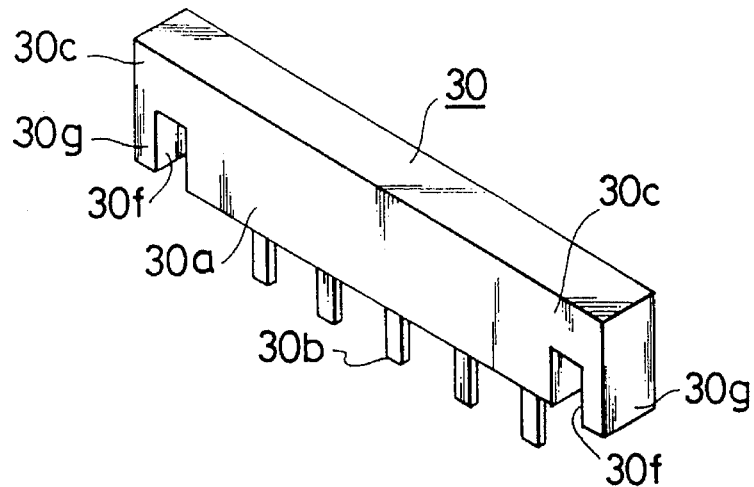
FIG. 22 is a perspective view showing a terminal assembly according to the ninth embodiment of the present invention.
Figure 23B:
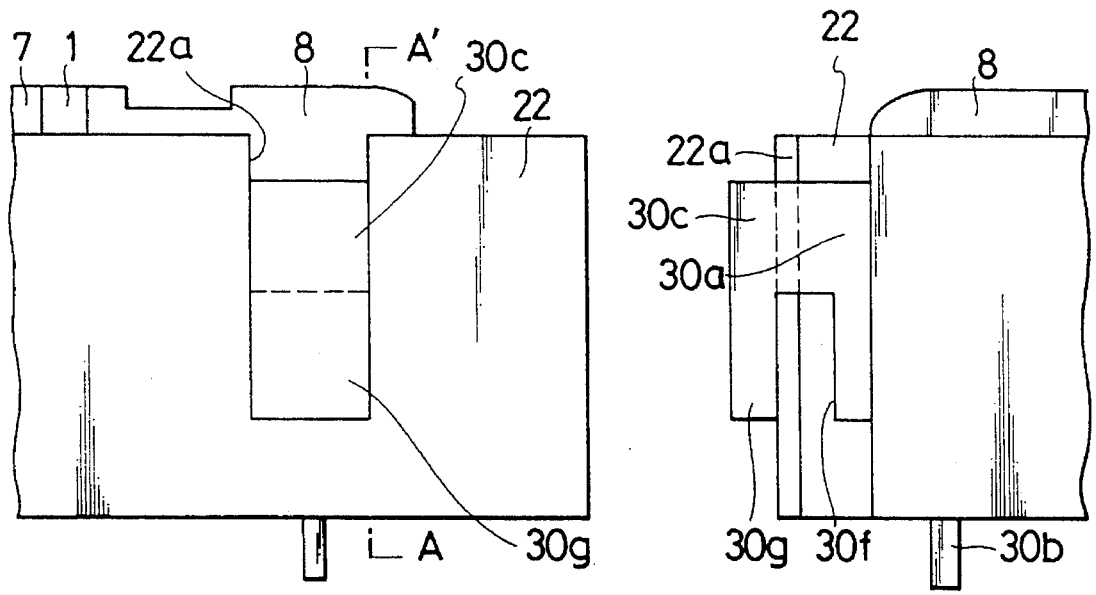
FIG. 23B is a cross-sectional view taken along line A–A' in FIG. 23A.
Figure 23A:
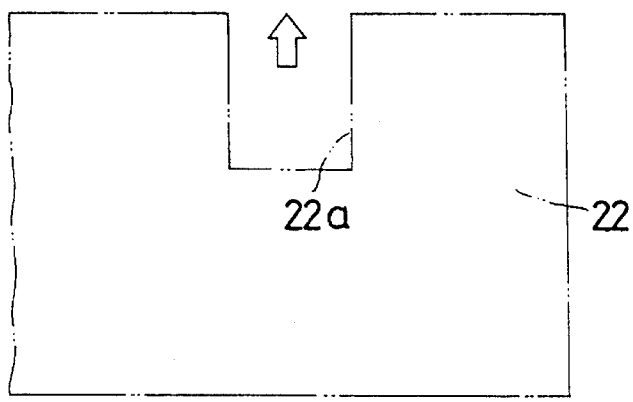
FIG. 23A is a front elevational view showing an arrangement of the connection portion of the terminal assembly shown in FIG. 22 to a shield ring.

Next, FIG. 22 and FIGS. 23A and 23B illustrate the ninth embodiment.

In this embodiment, as shown in FIG. 22, the terminal holding element 30a of the terminal assembly 30 is in the form of a prism over the entire length thereof and is formed with a rectangular groove 30f on each end portion 30c on the lower side thereof. Reference numeral 30g designates an outer peripheral portion of each groove 30f.

As shown in FIG. 23A, the shield 22 is formed with a rectangular recess 22a, whose width is equal to the width of the terminal 30c.

As shown in FIGS. 23A and 23B, the above-described construction makes it possible to press the terminal 30c into the notch 22a to have the lower peripheral portion of the notch 22a enter the groove 30f so that the peripheral portion 30g can be engaged with the shield ring 22. As a result, the shield ring 22 can be connected and fitted to the terminal holding element 30a firmly.

With the above-described construction, the shield ring 22 can be fitted to the magnetic head body easily and reliably as in the case of the fourth to eighth embodiments, thus reliably preventing dropping off of the shield ring 22. Furthermore, as shown in FIG. 23B, the shield ring 22 is fitted in the groove 30f protruding from the side surface of the slider 8, i.e., the side surface of the magnetic head body, in an engaged state, resulting in that it is easy to perform the positioning of the shield ring so that a predetermined gap can be formed between the shield ring 22 and the magnetic head body.

The present invention has been described in detail with respect to preferred embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. A magnetic head, comprising:

a magnetic core having a slidable contact surface and a side face, a coil bobbin having a height in a direction perpendicular to said slidable contact surface of said magnetic core, said coil bobbin being arranged around said magnetic core, a coil wound around said coil bobbin, a slider having a notch and connected to said side face of said magnetic core, said slider together with said magnetic core being in slidable contact with a contact surface of a magnetic recording medium, a plurality of terminals each of which is connected to an end of said coil, and a terminal holding member being disposed substantially within a space defined by said notch, said terminal holding member and said coil bobbin being remote from each other in a direction along said slidable contact surface of said magnetic core, said terminal holding member holding said plurality of terminals in a direction perpendicular to said slidable contact surface of said magnetic core, said terminal holding member being disposed within the height of said coil bobbin in the direction perpendicular to said slidable contact surface of said magnetic core so that said terminal holding member does not extend beyond said coil bobbin in the direction perpendicular to said slidable contact surface of said magnetic core.

2. A magnetic head as claimed in claim 1, wherein said terminal holding member is disposed within the width of said slider in a direction defined by connecting said slider with said magnetic core.

3. A magnetic head as claimed in claim 1, wherein an inner face of said slider constitutes said notch and is in contact with a first face of said terminal holding member which is opposite to a second face of said terminal holding member on which said terminals are planted.

4. A magnetic head, comprising:

a plurality of magnetic cores, each magnetic core having a slidable contact surface, said magnetic cores being connected to each other through a filler plate, a plurality of coil bobbins, each having a height in a direction perpendicular to said slidable contact surfaces of said magnetic cores, said coil bobbins being arranged around said magnetic cores, respectively, a plurality of coils each wound around a respective one of said coil bobbins, a slider having a notch and connected to said magnetic cores, said slider together with said magnetic cores being in slidable contact with a contact surface of a magnetic recording medium, a plurality of terminals which are connected to ends of said plurality of coils, and a terminal holding member being disposed substantially within a space defined by said notch, said terminal holding member and said plurality of coil bobbins being remote from each other in a direction along said slidable contact surfaces of said magnetic cores, said terminal holding member being disposed within the height of said coil bobbins in the direction perpendicular to said slidable contact surfaces of said magnetic cores so that said terminal holding member does not extend beyond said coil bobbins in the direction perpendicular to said slidable contact surfaces of said magnetic cores.

5. A magnetic head, comprising:

a core assembly including a recording/reproduction magnetic core for performing magnetic recording or reproduction of information to or from a magnetic recording medium and an erasing magnetic core for performing magnetic erasure of said magnetic recording medium, said cores each having a slidable contact surface, coils wound around said magnetic cores, respectively, through coil bobbins, the coil bobbins each have a height in a direction perpendicular to said slidable contact surfaces of said cores, a slider having a notch and connected to side faces of said magnetic cores, said slider together with said magnetic cores being in slidable contact with a contact surface of said magnetic recording medium, a first terminal assembly having a plurality of first terminals each of which is connected to an end of a coil wound around said erasing magnetic core and a first terminal holding member for holding said plurality of first terminals in a direction perpendicular to said slidable contact surfaces of said magnetic cores, said first terminal holding member being integrally formed in a first bobbin intervening between said erasing magnetic core and said coil wound around said erasing magnetic core, said first terminal holding member and said first bobbin being remote from each other in a direction along said slidable contact surfaces of said magnetic cores, said first terminal holding member being disposed within a space defined by said notch, said first terminal holding member being disposed within the height of said respective coil bobbins in the direction perpendicular to said slidable contact surfaces of said magnetic cores so that said first terminal holding member does not extend beyond said respective coil bobbins in the direction perpendicular to said slidable contact surfaces of said magnetic cores, and a second terminal assembly having a plurality of second terminals each of which is connected to an end of a coil wound around said recording/reproduction magnetic core and a second terminal holding member for holding said plurality of second terminals in a direction perpendicular to said slidable contact surface of said magnetic cores, said second terminal holding member being separated from a second bobbin intervening between said recording/reproduction magnetic core and said coil wound around said recording/reproduction magnetic core, said second terminal holding member being disposed within a space defined by said notch, said second terminal holding member being disposed within the height of said respective coil bobbins in the direction perpendicular to said slidable contact surface of said magnetic cores so that said second terminal holding member does not extend beyond said coil bobbins in the direction perpendicular to said slidable contact surfaces of said magnetic cores.

6. A magnetic head, comprising:

a magnetic head body including:

a magnetic core having a slidable contact surface, a coil bobbin having a height in a direction perpendicular to said slidable contact surface of said magnetic core, said coil bobbin being arranged around said magnetic core, a coil wound around said coil bobbin, a slider sandwiching said magnetic core, said slider together with said magnetic core being in slidable contact with a magnetic recording medium, and a terminal assembly having a terminal which is connected to an end of said coil, and a terminal holding member on which said terminal is planted, said terminal assembly being separated from said coil bobbin, said terminal holding member engaging with said slider, said terminal holding member having a projecting portion which protrudes from a surface of said magnetic head body, said terminal holding member being disposed within the height of said coil bobbin in the direction perpendicular to the slidable contact surface of said magnetic core so that said terminal holding member does not extend beyond said coil bobbin in the direction perpendicular to said slidable contact surface of said magnetic core, and a shield member for shielding said magnetic head body from external noise, said shield member engaging with said projecting portion of said terminal holding member.

7. A magnetic head as claimed in claim 6, wherein said terminal assembly is fitted in and fixed to said slider.

8. A magnetic head, comprising:

a magnetic head body, including:

a magnetic core having a slidable contact surface, a coil bobbin having a height in a direction perpendicular to said slidable contact surface of said magnetic core, said coil bobbin being arranged around said magnetic core, a coil being wound around said coil bobbin, a slider having a notch, said slider sandwiching said magnetic core, said slider together with said magnetic core being in slidable contact with a magnetic recording medium, and a holding member having an end which projects from an end of said slider, said holding member being disposed within a space defined by said notch, said holding member being disposed within the height of the coil bobbin in a direction perpendicular to the slidable contact surface of said magnetic core so that said holding member does not extend beyond said coil bobbin in the direction perpendicular to said slidable contact surface of said magnetic core, and a shield member having a connection portion connected to an end of said holding member and arranged around said magnetic head body to shield said magnetic head body from external noise.

9. A magnetic head as claimed in claim 8, wherein both ends of said holding member are projected from said slider, and said shield member has a pair of connection portions for connecting to said both ends of said holding member.

* * * * *